(12) United States Patent     (10) Patent No.:   US 12,612,008 B2

Kashio et al.           (45) Date of Patent:     Apr. 28, 2026

(54) PEDESTRIAN PROTECTION AIRBAG AND PEDESTRIAN AIRBAG DEVICE

(71) Applicant: TOYODA GOSEI CO., LTD., Kiyosu (JP)

(72) Inventors: Atsushi Kashio, Aichi (JP); Ken Nitayama, Aichi (JP); Yuto Nakamura, Aichi (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/185,427

(22) Filed: Apr. 22, 2025

(65)        Prior Publication Data

US 2025/0326370 A1     Oct. 23, 2025

(30)       Foreign Application Priority Data

Apr. 23, 2024   (JP) ................................ 2024-069909
Sep. 27, 2024   (JP) ................................ 2024-169133

(51) Int. Cl.
     B60R 21/36      (2011.01)

(52) U.S. Cl.
     CPC ................................... B60R 21/36 (2013.01)

(58) Field of Classification Search
     CPC ... B60R 21/36; B60R 2021/346; B60R 21/34; B60R 19/02; B60R 21/00; B60R 21/239; B60R 2021/2395
     See application file for complete search history.

(56)        References Cited

U.S. PATENT DOCUMENTS

2007/0023223 A1 *   2/2007   Okamoto .......... B32B 17/10761
                                   180/274

FOREIGN PATENT DOCUMENTS

| | | | | | |
|---|---|---|---|---|---|
| DE | 102012006430 | A1 * | 10/2013 | ............. | B60R 21/36 |
| EP | 2765036 | A1 * | 8/2014 | ............. | B60R 21/36 |
| JP | H06286568 | A * | 10/1994 | | |
| JP | 2000-264146 | A | 9/2000 | | |
| JP | 2020-157839 | A | 10/2020 | | |
| JP | 2023-071119 | A | 5/2023 | | |
| JP | 2023-071120 | A | 5/2023 | | |
| WO | WO-2007099912 | A1 * | 9/2007 | ......... | B60R 21/2338 |

OTHER PUBLICATIONS

Ishikawa, WO-2007099912-A1, Machine Translation of Specification (Year: 2007).*

(Continued)

*Primary Examiner* — Paul N Dickson
*Assistant Examiner* — Matthew Joseph Ganci
(74) *Attorney, Agent, or Firm* — Posz Law Group, PLC

(57)        ABSTRACT

A pedestrian protection airbag is formed in a bag-shape. The pedestrian protection airbag is stored in a folded state in a case which has an opening and is disposed in a vicinity of a rear end of a vehicle hood panel. The pedestrian protection airbag protrudes from the opening due to inflow of an inflation fluid to cover an upper surface of a front pillar. The pedestrian protection airbag has an outer peripheral sewn portion in which a plurality of panels are sewn together in a state where an inflow port into which the inflation fluid is allowed to flow is formed. The outer peripheral sewn portion has a general sewn portion, and a fragile sewn portion that is more easily broken than the general sewn portion.

5 Claims, 19 Drawing Sheets

(56) References Cited

OTHER PUBLICATIONS

Matsuoka, JP-H06286568-A, Machine Translation of Specification (Year: 1994).*
Lindberg, EP-2765036-A1, Machine Translation of Specification (Year: 2014).*
Freisler, DE-102012006430-A1, Machine Translation of Specification (Year: 2013).*

* cited by examiner

RIGHT SIDE                              LEFT SIDE

LEFT SIDE

RIGHT SIDE

ENLARGED CROSS-SECTIONAL VIEW OF A-A PART

FIG. 15

PEDESTRIAN PROTECTION AIRBAG AND PEDESTRIAN AIRBAG DEVICE

CROSS-REFERENCE TO RELATED APPLICATIONS

This application is based on and claims priority under 35 USC 119 from Japanese Patent Applications No. 2024-069909 filed on Apr. 23, 2024 and No. 2024-169133 filed on Sep. 27, 2024, the entire content of which is incorporated herein by reference.

TECHNICAL FIELD

The present disclosure relates to a pedestrian protection airbag mounted on a vehicle and a pedestrian airbag device disposed near a hood panel of the vehicle.

BACKGROUND ART

An airbag device that protects a pedestrian by deploying an airbag from the vicinity of a rear end of a hood panel at the time of a collision of a vehicle is known (for example, see JP2000-264146A and JP2020-157839A). This kind of airbag device includes a pedestrian protection airbag that is stored in a folded state in a case disposed below a rear end of the hood panel and having an opening before a vehicle collision, and a high-pressure generation source such as an inflator that generates an inflation fluid such as gas and supplies the fluid to the pedestrian protection airbag at the time of a vehicle collision. In the airbag device, in the event of a vehicle collision, the inflation fluid is generated by the high-pressure generation source, the inflation fluid is supplied to the pedestrian protection airbag, and the pedestrian protection airbag protrudes from the opening of the case and is deployed and inflated, thereby protecting the pedestrian.

The pedestrian protection airbag is formed in a bag shape to confine the fluid supplied for deployment and inflation, and is formed to cover an upper surface of a front pillar of the vehicle at the time of deployment and inflation. In general, in order to form the airbag in a bag shape, a method of sewing a plurality of panels obtained by cutting a fabric woven in a planar shape into a predetermined shape is considered. According to this bag-shaped airbag, since a desired three-dimensional shape can be quickly formed at the time of deployment and inflation, the pedestrian protection performance at the time of a vehicle collision can be improved.

Further, as the above pedestrian protection airbag, there is a configuration having an exhaust hole capable of exhausting inflation gas flowing into the inside to the outside in order to prevent a sudden increase in an internal pressure when a person to be protected (an occupant, a pedestrian, and the like) is received (for example, see JPH06-286568A). Specifically, there is a configuration in which the exhaust hole is disposed at a position near an outer peripheral edge of the airbag at the time of completion of inflation, the exhaust hole is folded toward an inner peripheral side of the airbag together with a peripheral region, and the peripheral region is sewn to maintain the folded state. Then, a sewn portion that maintains the folded state of the arrangement region of the exhaust hole is configured such that the sewn state is released so as to divide a part of a sewing thread, the folded state of the region of the peripheral edge of the exhaust hole is released, and the exhaust hole is opened between immediately before the completion of inflation of the airbag and immediately after the completion.

In the structure in which the airbag is formed by sewing the plurality of panels together as described above, the airbag includes outer peripheral sewn portions. The outer peripheral sewn portion is a linearly extending portion obtained by sewing the plurality of panels together, and is formed except for a portion of an inflow port into which the inflation fluid can flow. In the airbag including the outer peripheral sewn portion, it is appropriate to have a sewing strength large enough to withstand absorption of a maximum impact assumed as an input after the deployment and inflation.

However, when the outer peripheral sewn portion of the airbag is formed to have a substantially uniform sewing strength over the entire outer peripheral sewn portion, there is a possibility that the internal pressure of the airbag excessively increases when there is an input to the airbag after the deployment and inflation. In particular, since it is sufficient that the pedestrian protection airbag can cover the upper surface of the front pillar having a narrow width at the time of deployment and inflation, the capacity is generally relatively small, and when the sewing strength of the outer peripheral sewn portion in the pedestrian protection airbag is substantially uniform over the whole, the internal pressure of the pedestrian protection airbag is likely to increase suddenly at the time of pedestrian input to the pedestrian protection airbag as compared with an occupant protection airbag or the like having a relatively large capacity. Therefore, the pedestrian protection airbag has a limit in terms of pedestrian protection.

Further, since the sewn portion that maintains the folded state of the arrangement region of the exhaust hole is disposed near the outer peripheral edge of the airbag that is inflated in a substantially disk shape (specifically, at a position slightly inside the outer peripheral edge), for example, in a case where wrinkles or the like occur in the vicinity of the outer peripheral edge of the airbag at the time of completion of inflation, stress concentration that breaks the sewing thread constituting the sewn portion may be unlikely to occur in the sewn portion, and the exhaust hole may not be able to be quickly opened.

In the pedestrian airbag device, a pedestrian (including a bicycle rider) who has collided with a vehicle is received and protected by the inflated airbag, but in the pedestrian airbag device, since a time from detection of a collision between the vehicle and the pedestrian to start of reception of the pedestrian is relatively long, it is desirable to maintain the internal pressure of the airbag high for a relatively long time, and in order to maintain the internal pressure, the airbag is usually formed by a coated fabric in which a coating agent for preventing gas leakage is applied to a surface of a woven fabric. However, in order to smoothly protect the pedestrian by the inflated airbag, it is desirable that the internal pressure of the airbag at the time of receiving the pedestrian is not too high, and it is desirable to smoothly exhaust excess inflation gas flowing into the inside at the time of receiving the pedestrian.

SUMMARY OF INVENTION

An object of the present disclosure is to provide a pedestrian protection airbag capable of improving pedestrian protection performance by preventing an increase in internal pressure in a later stage of pedestrian input while ensuring impact absorption performance in an initial stage of the pedestrian input.

Another object of the present disclosure is to provide a pedestrian airbag device capable of stably exhausting inflation gas from an airbag when receiving a pedestrian.

A first aspect of the present disclosure relates to a pedestrian protection airbag formed in a bag-shape, stored in a folded state in a case which has an opening and is disposed in a vicinity of a rear end of a vehicle hood panel, and protruding from the opening due to inflow of an inflation fluid to cover an upper surface of a front pillar, the pedestrian protection airbag including:

an outer peripheral sewn portion in which a plurality of panels are sewn together in a state where an inflow port into which the inflation fluid is allowed to flow is formed, in which the outer peripheral sewn portion has:

a general sewn portion; and a fragile sewn portion that is more easily broken than the general sewn portion.

According to the configuration of the first aspect, it is possible to improve pedestrian protection performance by preventing an increase in internal pressure in a later stage of the pedestrian input while ensuring impact absorption performance in an initial stage of the pedestrian input.

A second aspect of the present disclosure relates to a pedestrian airbag device including:

an airbag stored in a folded state in a storage portion which is disposed near a hood panel of a vehicle; and an inflator configured to supply inflation gas to the airbag, in which the airbag is formed in a bag shape by joining outer peripheral edges of a vehicle body side panel disposed on a body side of the vehicle and a pedestrian side panel disposed on a pedestrian side when inflation is completed, the airbag includes:

a protection main body portion disposed to cover the hood panel or a region near the hood panel when the inflation is completed, and configured to receive a pedestrian; and a gas-exhaust portion opened when the pedestrian is received, and configured to exhaust inflation gas flowed into the protection main body portion, the gas-exhaust portion is formed to be continuous from the protection main body portion, is disposed to protrude outward from an outer peripheral edge joint portion that constitutes an outer peripheral edge of the protection main body portion when the inflation of the airbag is completed, and has a temporary joint portion configured to join the vehicle body side panel and the pedestrian side panel to close a terminal side in a region deviated outward from the outer peripheral edge joint portion, and the temporary joint portion is configured to be released from a joining state between the vehicle body side panel and the pedestrian side panel when an internal pressure in the protection main body portion increases at a time of reception of the pedestrian.

In the configuration of the second aspect, the gas-exhaust portion capable of exhausting the inflation gas flowed into the protection main body portion when the pedestrian is received is disposed to protrude outward from the outer peripheral edge joint portion constituting the outer peripheral edge of the protection main body portion when the inflation of the airbag is completed, and the gas-exhaust portion is closed on the terminal side by the temporary joint portion formed by joining the vehicle body side panel and the pedestrian side panel in the region deviated outward from the outer peripheral edge joint portion. Therefore, the gas-exhaust portion (temporary joint portion) is less likely to be affected by the vicinity of the outer peripheral edge (outer peripheral edge joint portion disposed on the outer peripheral edge side) of the protection main body portion, and when the internal pressure in the protection main body portion increases at the time of receiving the pedestrian, a force that releases the joining state between the pedestrian side panel and the vehicle body side panel can stably act on the temporary joint portion, and the joining state by the temporary joint portion can be stably and quickly released. As a result, by releasing the joining state of the temporary joint portion, the terminal side of the gas-exhaust portion can be stably opened to separate the pedestrian side panel and the vehicle body side panel, and the inflation gas in the protection main body portion can be stably exhausted to the outside.

Therefore, the inflation gas can be stably exhausted from the airbag when a pedestrian is received.

In the pedestrian airbag device of the second aspect, the temporary joint portion is configured by a sewn portion where the vehicle body side panel and the pedestrian side panel are sewn together using a sewing thread, and the sewn portion has a starting point portion that is disposed at an intermediate portion to protrude toward a side of the protection main body portion and serves as a starting point of breakage when the internal pressure increases.

With such a configuration of the pedestrian airbag device, when the inflation of the airbag is completed, stress concentration can be generated in the vicinity of the starting point portion of the sewn portion constituting the temporary joint portion, the sewing thread can be quickly divided (cut) in the vicinity of the starting point portion, and the joining state (sewn state) by the temporary joint portion can be quickly released due to the occurrence of coming-off of the thread or the like.

BRIEF DESCRIPTION OF DRAWINGS

Exemplary embodiment(s) of the present invention will be described in detail based on the following figures, wherein:

FIG. 15 is a plan view in which substrates constituting the airbag of FIG. 12 are arranged;

DESCRIPTION OF EMBODIMENTS

First Embodiment

Figure 1:
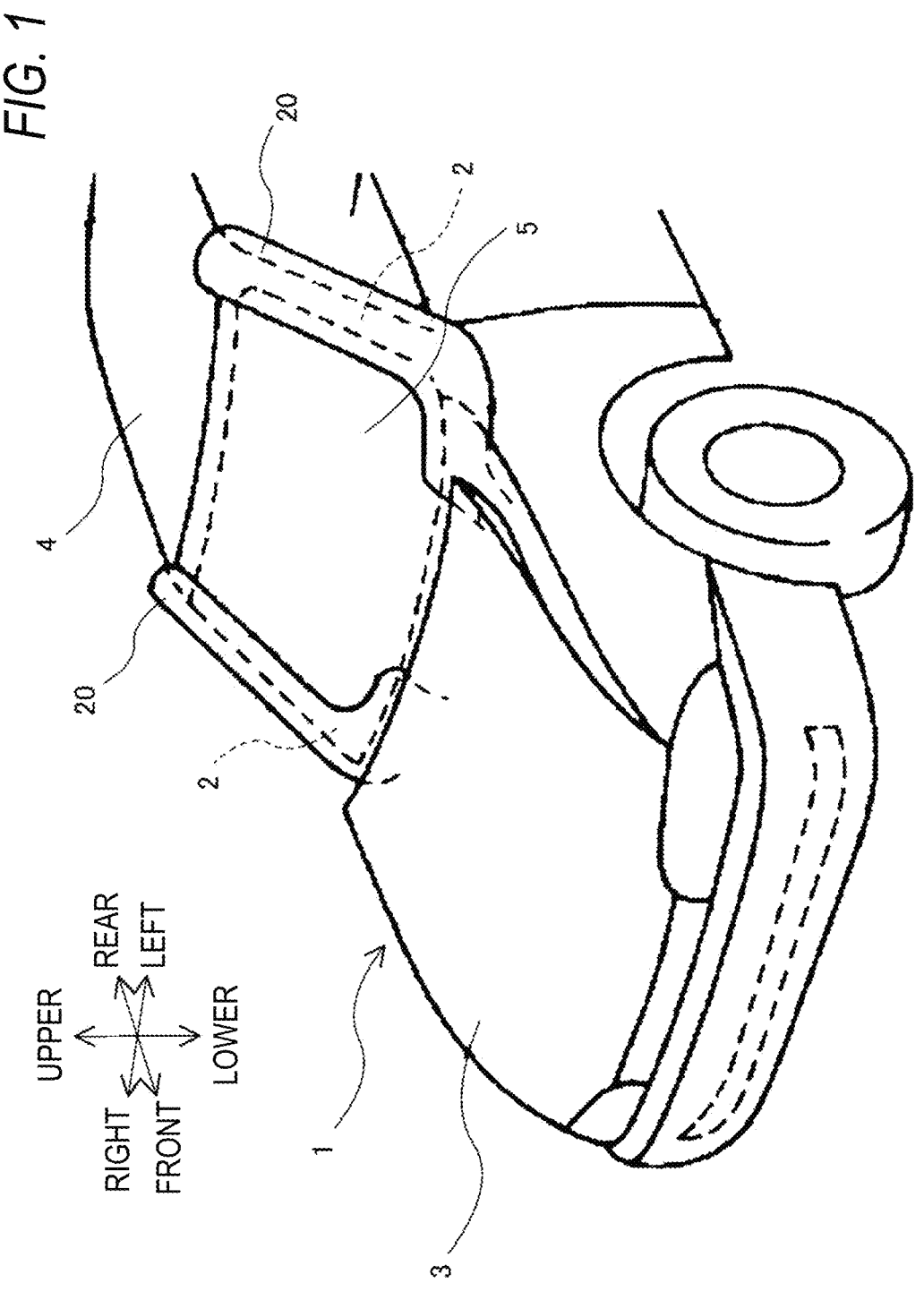
FIG. 1 is a perspective view illustrating a vehicle in which pedestrian protection airbags according to a first embodiment are deployed and inflated.

Hereinafter, a pedestrian protection airbag according to a first embodiment of the present disclosure will be described with reference to FIGS. 1 to 9. In the present embodiment, "front", "rear", "right", "left", "upper", and "lower" are based on directions of the vehicle on which the pedestrian protection airbag is mounted, and for example, "front" means a side ahead in which the vehicle moves forward.

A pedestrian protection airbag 20 of the present embodiment is a bag-shaped member that is mounted on the vehicle 1 and protects a pedestrian colliding with a vehicle 1. In addition, the concept of the pedestrian is primarily a person walking or running on a road surface, and may include vulnerable road users such as people in wheelchairs or people riding bicycles, animals such as dogs and cats, and even inanimate objects such as robots. The vehicle 1 is an engine vehicle, an electric vehicle, a fuel cell vehicle, or the like, and is an automobile in which a vehicle interior of a vehicle occupant is partitioned by a pillar. Hereinafter, the pedestrian protection airbag 20 is simply referred to as the airbag 20.

The airbags 20 can cover upper surfaces of front pillars 2 disposed on a left portion and a right portion of the vehicle 1, respectively. One airbag 20 is disposed on each of the left and right sides corresponding to the left and right front pillars 2. Each airbag 20 has a capacity of, for example, 50 to 90 liters, and preferably has a capacity of about 70 liters.

Note that, as long as the airbags 20 are inflated in a range in which the upper surfaces of the left and right front pillars 2 can be covered, one airbag 20 may be disposed on each of the left and right sides corresponding to the left and right front pillars 2 as described above, or one airbag 20 may be mounted on the vehicle 1. When one airbag 20 is mounted on the vehicle 1, the airbag 20 may have a function of lifting a rear end of a vehicle hood panel 3. The vehicle hood panel 3 is a panel member that covers a battery, an engine, and an upper portion of a front accommodating portion disposed in the front of the vehicle interior.

The airbag 20 is in a folded state before the inflation fluid flows in, and is deployed and inflated by the inflow of the inflation fluid. The airbag 20 is stored in the case 10. The case 10 is formed in a case shape having a storage space. The case 10 is disposed in the vicinity of the rear end of the vehicle hood panel 3, for example, below the rear end thereof. The case 10 is attached and fixed to a structure of the vehicle 1 at a bottom wall and a side wall.

The case 10 has an opening 11. The opening 11 is an outlet for deploying and inflating the airbag 20 from the inside of the case 10. The opening 11 is provided in an upper portion of the case 10, and is formed in a rectangular or circular shape in which the airbag 20 can be deployed and inflated. The airbag 20 is stored in the case 10 in the folded state before the inflation fluid flows in, and after the inflation fluid flows in, the airbag 20 protrudes upward from the opening 11 and is deployed and inflated toward the front pillar 2. The case 10 can support the airbag 20 without moving even when receiving a reaction force from the airbag 20 at the time of deployment and inflation of the airbag 20, and can stably receive the airbag 20 even when a pedestrian to be protected comes into contact with the airbag 20.

The inflation fluid flowing into the airbag 20 is gas. The inflation fluid is generated by a high-pressure generation source 12. The gas generated by the high-pressure generation source 12 is guided into the airbag 20, and deploys and inflates the airbag 20. The high-pressure generation source 12 may be an inflator that generates gas by ignition using a gas generating agent, or may generate gas by breaking a wall of a high-pressure container. Further, the inflation fluid may be, for example, liquid, gel, or the like instead of gas.

The high-pressure generation source 12 may be entirely disposed outside the bag of the airbag 20, or may be partially or entirely disposed inside the airbag 20. The high-pressure generation source 12 may be disposed inside the case 10, or may be disposed below the bottom wall of the case 10 and connected to an inflow port of the airbag 20 via a hole formed in the bottom wall.

The material of the airbag 20 is preferably a foldable and deployable material, and is preferably a flexible and high-strength material. The material of the airbag 20 may be, for example, a woven fabric using high-strength resin fibers such as polyester or polyamide.

As illustrated in FIG. 1, the airbag 20 may be formed in an arm shape or a hollow columnar shape capable of covering the upper surface of each front pillar 2 from an end portion on a vehicle hood panel 3 side to an end portion on a vehicle roof 4 side at the time of deployment and inflation, may be formed in a wide shape including at least a portion between left and right ends of each front pillar 2 and a part of a windshield glass 5 adjacent to a vehicle center side of the front pillar 2, and may be formed in a shape particularly including left and right end portions of a rear end portion of the vehicle hood panel 3.

The airbag 20 is formed by a plurality of panels 21 sewn together. The airbag 20 is formed in a bag shape by sewing and integrating the plurality of panels 21. The number of panels 21 constituting the airbag 20 is, for example, two. Hereinafter, the two panels 21 are appropriately referred to as panels 21a and 21b. Each of the panels 21a and 21b is formed in a planar panel shape.

Each of the two panels 21a and 21b has a planar shape such that a cross-sectional shape thereof becomes a desired shape when the airbag 20 is inflated and deployed. Each of the panels 21a and 21b is formed by cutting a fabric woven in a planar shape into a predetermined shape. The shape of the panel 21a and the shape of the panel 21b may be the same or different from each other. The airbag 20 corresponding to the front pillar 2 on the right side of the vehicle 1 and the airbag 20 corresponding to the front pillar 2 on the left side of the vehicle 1 may be configured such that their cross-sectional shapes are symmetrical with respect to each other when inflated and deployed.

The airbag 20 includes outer peripheral sewn portions 22. The outer peripheral sewn portion 22 is a portion where the two panels 21a and 21b are sewn together. Specifically, the outer peripheral sewn portion 22 is a portion where the two panels 21a and 21b are sewn together in a state where an inflow port 23 through which the inflation fluid can flow into the airbag 20 is formed. The airbag 20 is formed in a bag shape in which the inflow port 23 into which the inflation fluid can flow is formed by sewing outer peripheral edge portions of the two panels 21a and 21b together by the outer peripheral edge sewn portions 22 in the state where the panels 21a and 21b overlap each other.

The outer peripheral sewn portion 22 extends linearly using a thread. The outer peripheral sewn portion 22 is formed mainly along the end sides of the panels 21a and 21b at positions located inward from the ends of the panels 21a and 21b. One end and the other end of the outer peripheral sewn portion 22 face the inflow port 23. The outer peripheral sewn portion 22 is continuous between one end and the other end thereof.

The outer peripheral sewn portion 22 may be limited to the thread, but may also include a portion where the two panels 21a and 21b are sewn together with the thread. Further, the outer peripheral sewn portion 22 may be sewn with one thread in an extending direction (note that the thread itself may be a bundle of a plurality of fibers), or may be sewn with a plurality of threads arranged at predetermined intervals in a width direction orthogonal to the extending direction of the thread.

Figure 4:
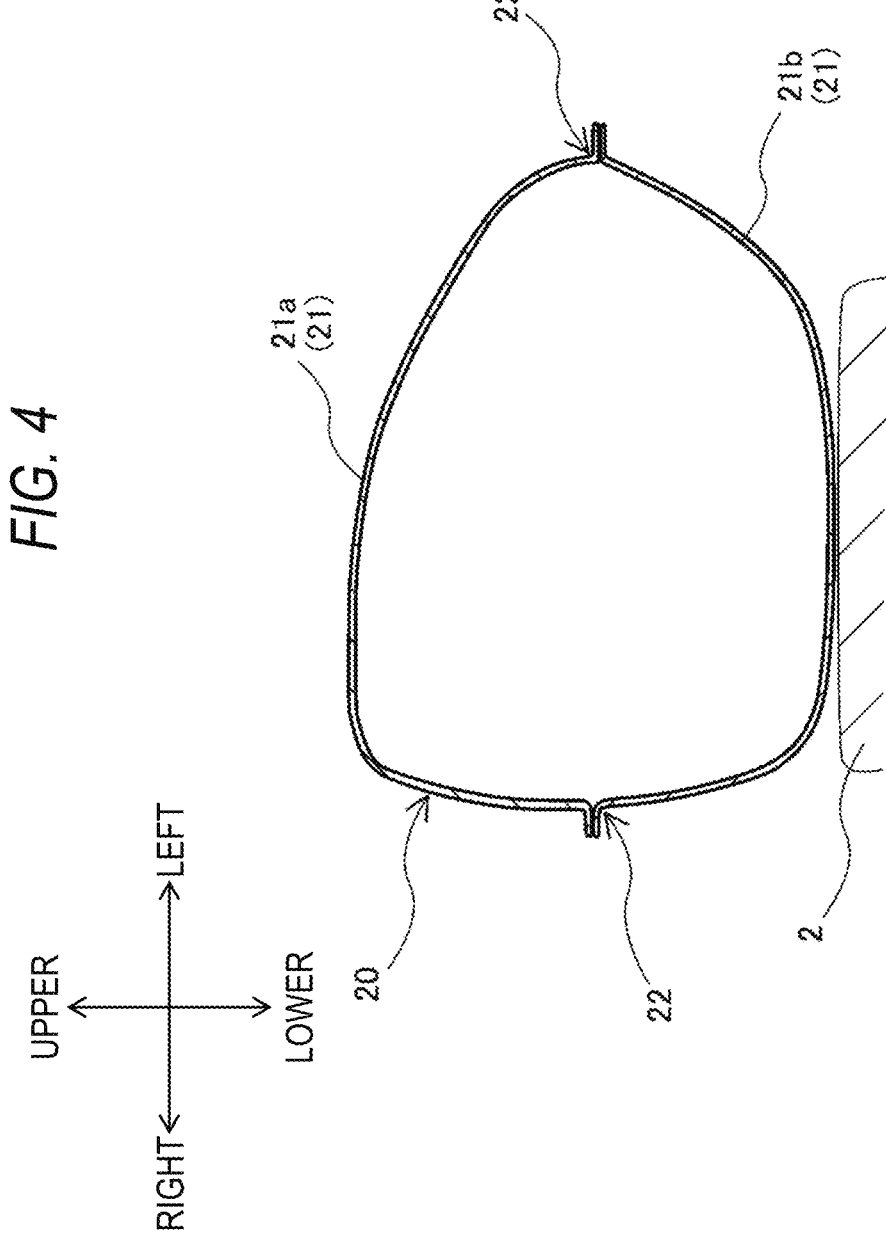
FIG. 4 is a cross-sectional view of the pedestrian protection airbag illustrated in FIG. 2 taken along a line IV-IV.

As illustrated in FIG. 4, the airbag 20 is configured such that the panel 21a is located on an upper side and the panel 21b is located on a lower side and in contact with the front pillar 2 at the time of deployment and inflation. That is, the airbag 20 is configured such that the outer peripheral sewn portions 22 are located on the right and left of the circumferential position of the airbag 20 without coming into contact with the front pillar 2 during deployment and inflation. Hereinafter, the panel 21a is referred to as a front-side panel 21a, and the panel 21b is referred to as a back-side panel 21b.

Figure 5:
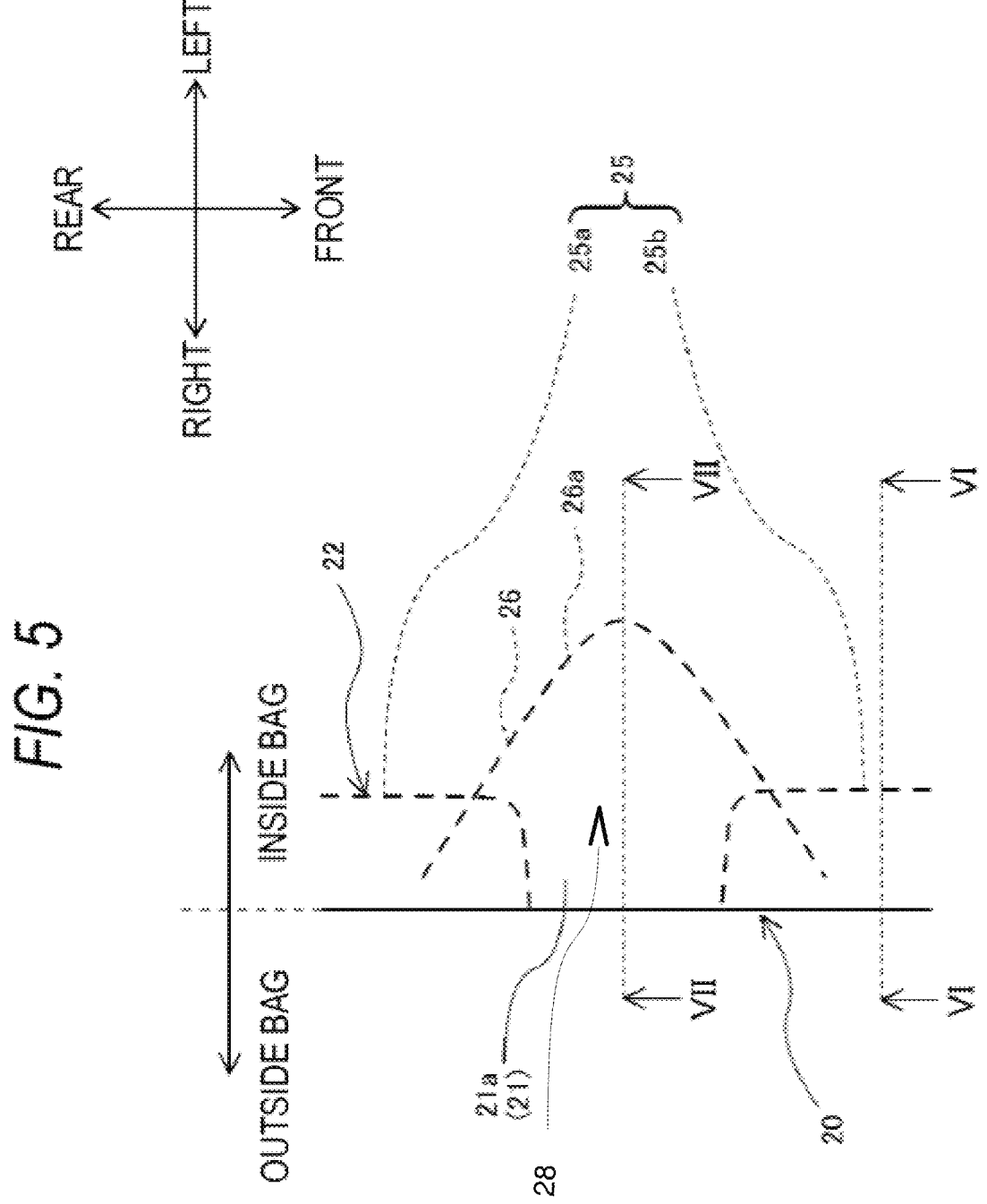
FIG. 5 is a plan view of a main portion of an outer peripheral sewn portion of the pedestrian protection airbag of the first embodiment.
Figure 6:
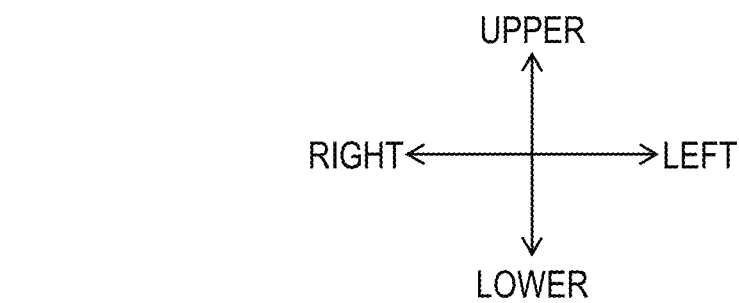
FIG. 6 is a cross-sectional view of the pedestrian protection airbag (at the time of deployment and inflation) of the first embodiment taken along a line VI-VI illustrated in FIG. 5.
Figure 6:
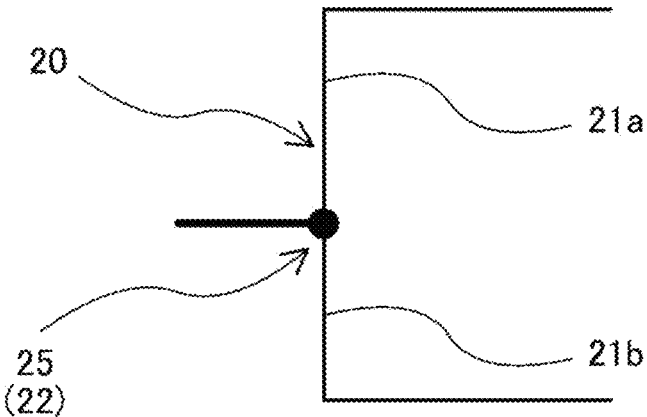
Figure 7:
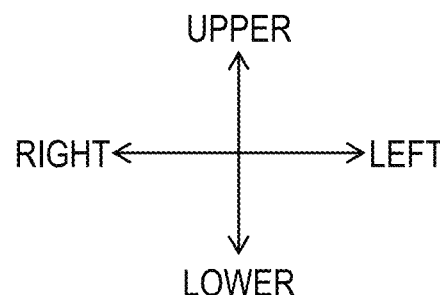
FIG. 7 is a cross-sectional view of the pedestrian protection airbag (at the time of deployment and inflation) of the first embodiment taken along a line VII-VII illustrated in FIG. 5.
Figure 7:
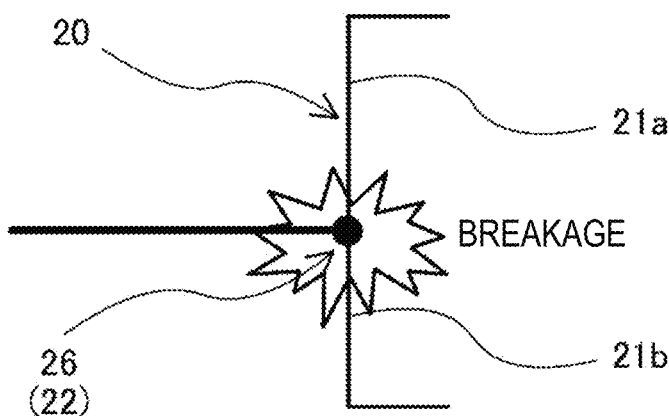

The outer peripheral sewn portion 22 is not formed to have a substantially uniform sewing strength over the entire outer peripheral sewn portion 22, and is configured to be partially easily broken. That is, as illustrated in FIGS. 5, 6, and 7, the outer peripheral sewn portion 22 includes a general sewn portion 25 and a fragile sewn portion 26. The fragile sewn portion 26 is a portion of the outer peripheral sewn portion 22 that is more easily broken than the general sewn portion 25. The "sewing strength" is the degree of difficulty in tearing stitches between the front-side panel 21a and the back-side panel 21b, and the "breaking" refers to the tearing of the stitches.

Figure 8:
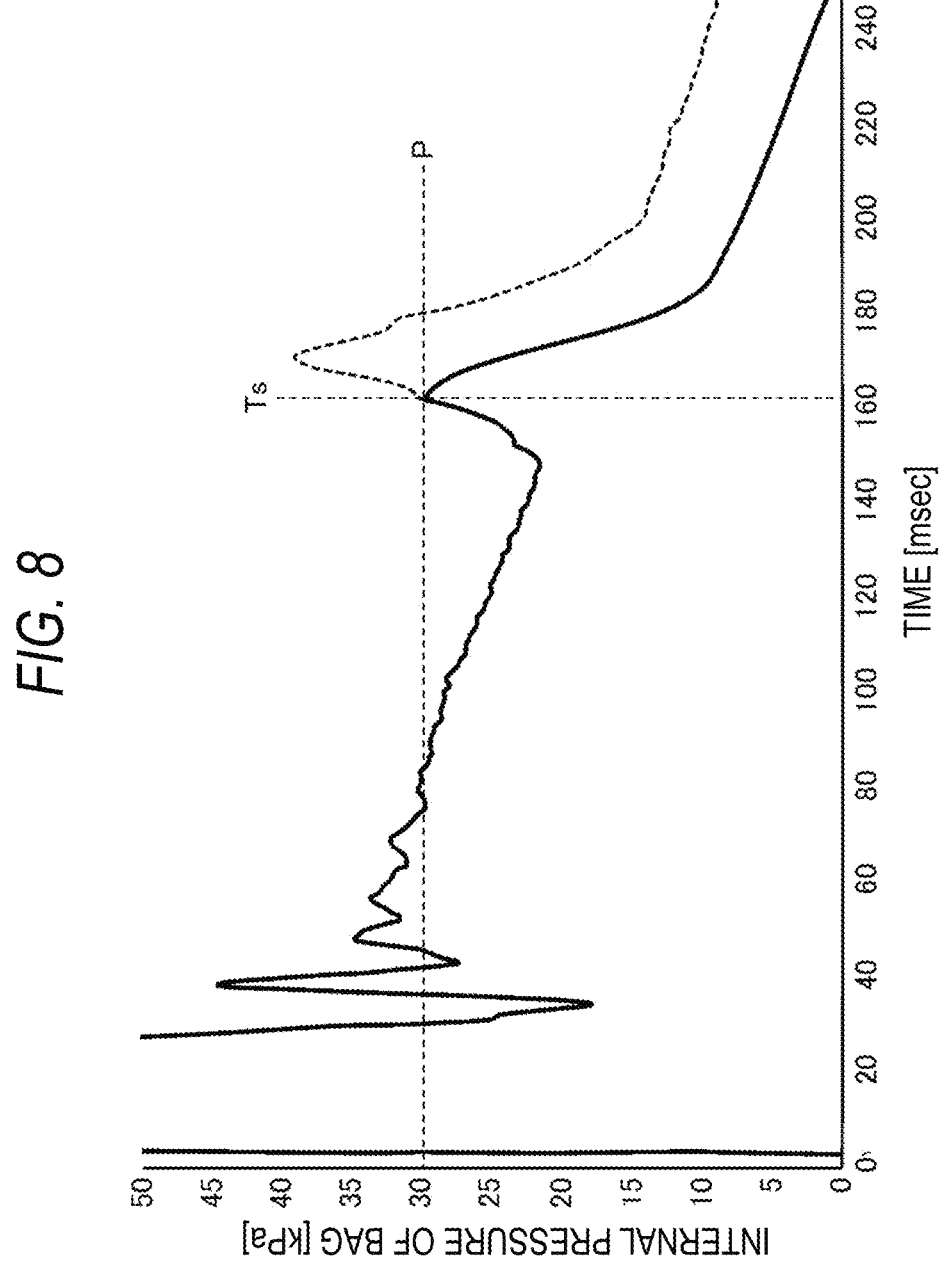
FIG. 8 is a diagram illustrating an effect obtained by comparing the pedestrian protection airbag of the first embodiment with a pedestrian protection airbag of a comparative example without a fragile sewn portion.

In the fragile sewn portion 26, when an internal pressure of the airbag 20 increases due to the inflow of the inflation fluid, the stitches are torn before the general sewn portion 25. As illustrated in FIG. 8, a timing at which the stitches of the fragile sewn portion 26 are torn is when the internal pressure of the airbag 20 once increases due to the inflow of the inflation fluid, the internal pressure of the airbag 20 starts to decrease due to the stop of the inflow of the inflation fluid, and then the internal pressure of the airbag 20 increases again due to the input of the pedestrian to the airbag 20 and reaches a predetermined pressure P. Note that this timing may be, for example, when the predetermined time Ts has elapsed from the ignition of an inflator that is the high-pressure generation source 12.

The fragile sewn portion 26 is configured to interrupt continuity of the general sewn portion 25. Compared to the general sewn portion 25, the fragile sewn portion 26 is formed such that, for example, the thread is thinner, a total width of the thread is narrower, the stitches are spaced more roughly, and/or the stitches are shaped to be more likely to tear. As the shape that makes the stitches more likely to tear, for example, the general sewn portion 25 may be formed in a linear shape such as a substantially linear shape or a curved shape, and the fragile sewn portion 26 may be formed to protrude away from a straight line of the substantially straight general sewn portion 25 or to have a greater curvature than the curved general sewn portion 25. The fragile sewn portion 26 may be made of a material having a lower strength than the material of the general sewn portion 25.

The fragile sewn portion 26 is set such that a sewing strength thereof is lower than a strength with which the fabric of the panel 21 is torn and lower than a sewing strength of the general sewn portion 25. The sewing strength of the fragile sewn portion 26 is determined, for example, in a range of 25 kPa to 35 kPa, and specifically, is preferably set to 30 kPa.

The fragile sewn portion 26 is provided at a position separated from a position facing the inflow port 23 in the outer peripheral sewn portion 22 in an extending direction in which pillars extend when the airbag 20 is deployed and inflated. The fragile sewn portion 26 is provided at one position in the outer peripheral sewn portion 22. Specifically, the fragile sewn portion 26 may be disposed on a left-right outer side of the vehicle 1 in the outer peripheral sewn portion 22, but is preferably disposed on a left-right center side of the vehicle 1. The fragile sewn portion 26 is disposed on the left-right center side because it is effective to dispose the fragile sewn portion 26 at a location inside the airbag 20 that is sandwiched between the pedestrian and the front pillar 2 or between the pedestrian and the vicinity of a boundary between the front pillar 2 and the windshield glass 5 and easily receives a reaction force at the time of the pedestrian input.

Further, the fragile sewn portion 26 is preferably disposed at an intermediate portion of the outer peripheral sewn portion 22 in the extending direction. The fragile sewn portion 26 is disposed at the intermediate portion because it is effective to dispose the fragile sewn portion 26 at a position inside the airbag 20 where an impact is effectively transmitted and responsiveness is good regardless of the pedestrian input position. The fragile sewn portion 26 may be provided at a plurality of positions separated from each other in the outer peripheral sewn portion 22.

As illustrated in FIG. 5, the airbag 20 includes a vent hole portion 28. The vent hole portion 28 is a ventilation portion that allows the inside and the outside of the airbag 20 to communicate with each other. The vent hole portion 28 has a function of discharging the inflation fluid in the airbag 20 to the outside of the bag to reduce the internal pressure of the airbag 20. The vent hole portion 28 is provided at a boundary portion between the front-side panel 21a and the back-side panel 21b. The vent hole portion 28 allows the inside and the outside of the airbag 20 to communicate with each other when the fragile sewn portion 26 is broken.

Figure 2:
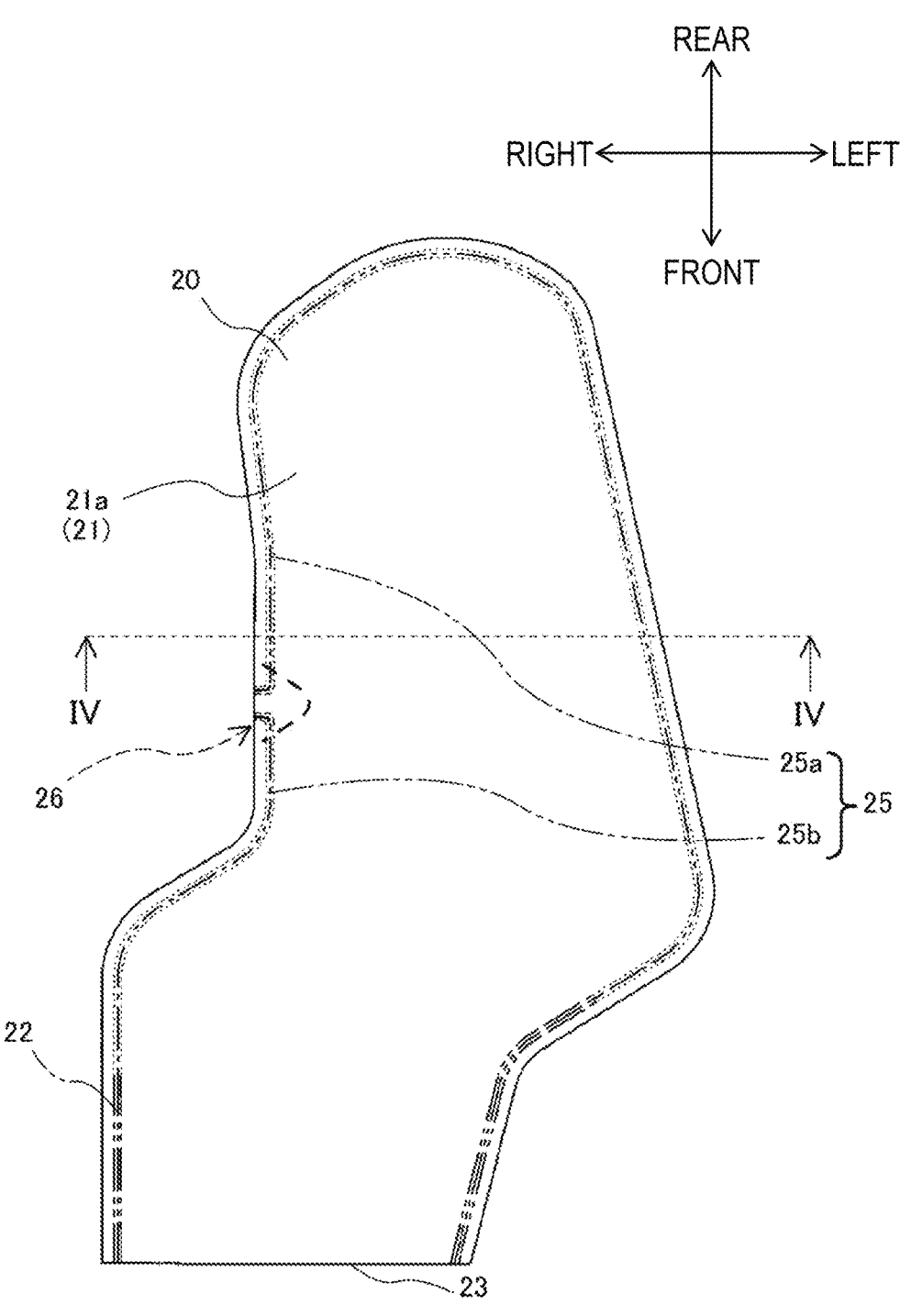
FIG. 2 is a view illustrating a state where the pedestrian protection airbag (for a left front pillar) of the first embodiment is inflated and deployed, as viewed from above the vehicle.
Figure 3:
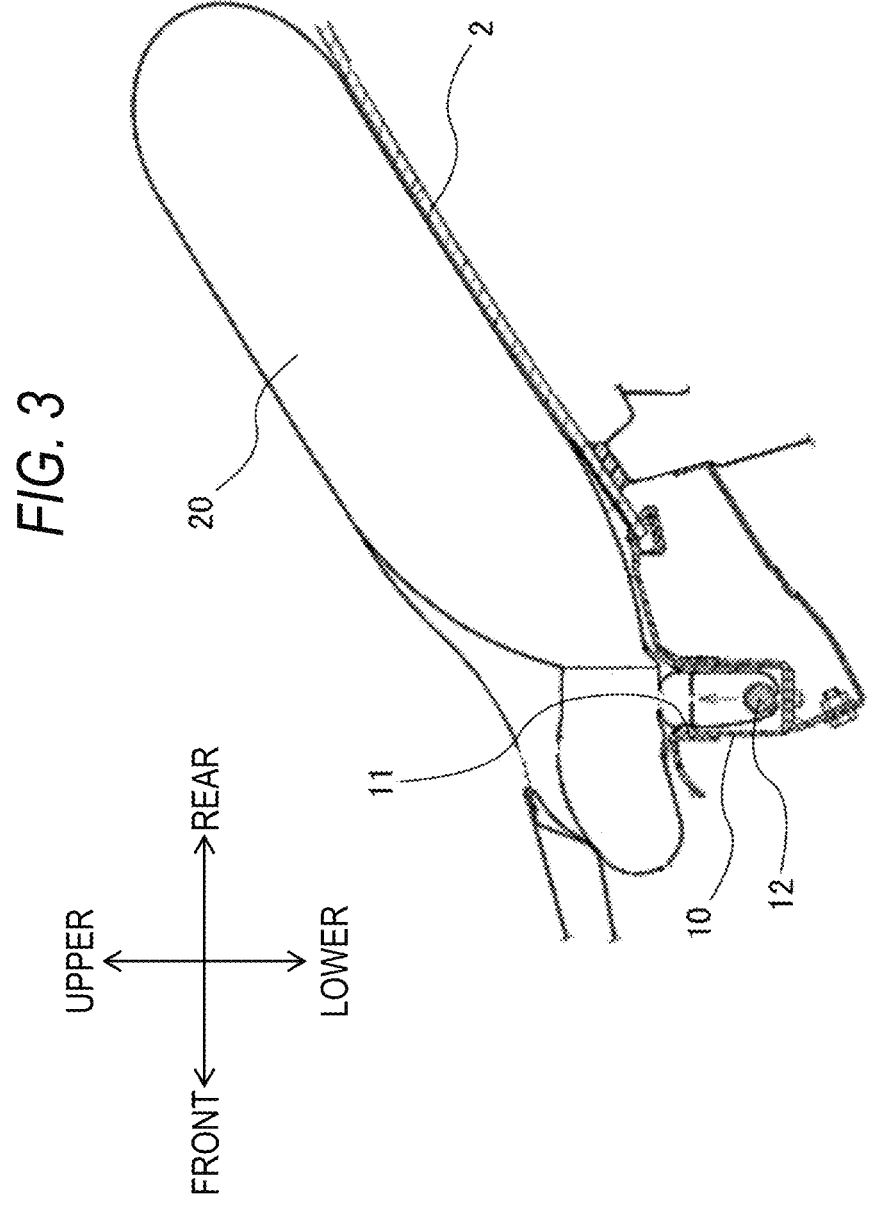
FIG. 3 is a view illustrating a state where the pedestrian protection airbag of the first embodiment is inflated and deployed, as viewed from a side of the vehicle.

The general sewn portion 25 is provided separately at two positions across the vent hole portion 28 in the airbag 20. That is, as illustrated in FIG. 2, the general sewn portion 25 includes a first general sewn portion 25a and a second general sewn portion 25b. The stitches of the first general sewn portion 25a and the second general sewn portion 25b extend linearly and are separated from each other. The vent hole portion 28 is disposed between the first general sewn portion 25a and the second general sewn portion 25b.

The first general sewn portion 25a extends linearly from one end facing the left-right outer end of the inflow port 23 to the other end facing a left-right center side of the airbag 20. Further, the second general sewn portion 25b extends linearly from one end facing a left-right center side of the inflow port 23 to the other end facing the left-right center side of the airbag 20. The other end of the first general sewn portion 25a and the other end of the second general sewn portion 25b face the left-right center side of the airbag 20. The vent hole portion 28 is formed between the other end of the first general sewn portion 25a and the other end of the second general sewn portion 25b.

The first general sewn portion 25a extends in a straight line at a position located inward from the ends of the panels 21a and 21b near the other end facing the left-right center side of the airbag 20 (excluding a very small line portion leading to the other end). The second general sewn portion 25b extends substantially linearly at a position located inward from the ends of the panels 21a and 21b near the other end facing the left-right center side of the airbag 20 (excluding a very small line portion leading to the other end). A straight portion near the other end portion of the first general sewn portion 25a and a straight portion near the other end portion of the second general sewn portion 25b are located on a substantially straight line.

The fragile sewn portion 26 is formed to connect the first general sewn portion 25a and the second general sewn portion 25b before the inflation fluid flows into the airbag 20. The fragile sewn portion 26 intersects both the first general sewn portion 25a and the second general sewn portion 25b. The end portion of the fragile sewn portion 26 may not be in contact with the general sewn portion 25, and may not be exposed to the outside at the end of the panel 21.

The fragile sewn portion 26 is formed to connect the first general sewn portion 25a and the second general sewn portion 25b in a non-linear manner. Specifically, the fragile sewn portion 26 protrudes out of a virtual straight line (line segment) obtained by connecting a straight portion near the other end portion of the first general sewn portion 25a and a straight portion near the other end portion of the second general sewn portion 25b. The "non-linear line" refers to a curved line, a curve, a bend, a refraction, a wave, or the like.

The fragile sewn portion 26 is formed to close the vent hole portion 28. The fragile sewn portion 26 is formed at a position located inside the bag from an outer edge of the vent hole portion 28 in the panel 21.

As illustrated in FIG. 5, the fragile sewn portion 26 has a convex portion 26a. The convex portion 26a is formed to protrude toward the inside of the airbag 20. The convex portion 26a is formed to interrupt the continuity of the stitches of the general sewn portion 25. The convex portion 26a protrudes between the first general sewn portion 25a and the second general sewn portion 25b toward the inside of the bag with respect to the outer edge of the airbag 20 formed by the general sewn portions 25a and 25b.

Figure 9:
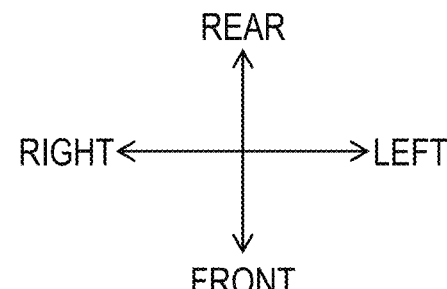
FIG. 9 is a plan view of a main part of an outer peripheral sewn portion of a pedestrian protection airbag according to a modification of the first embodiment.
Figure 9:
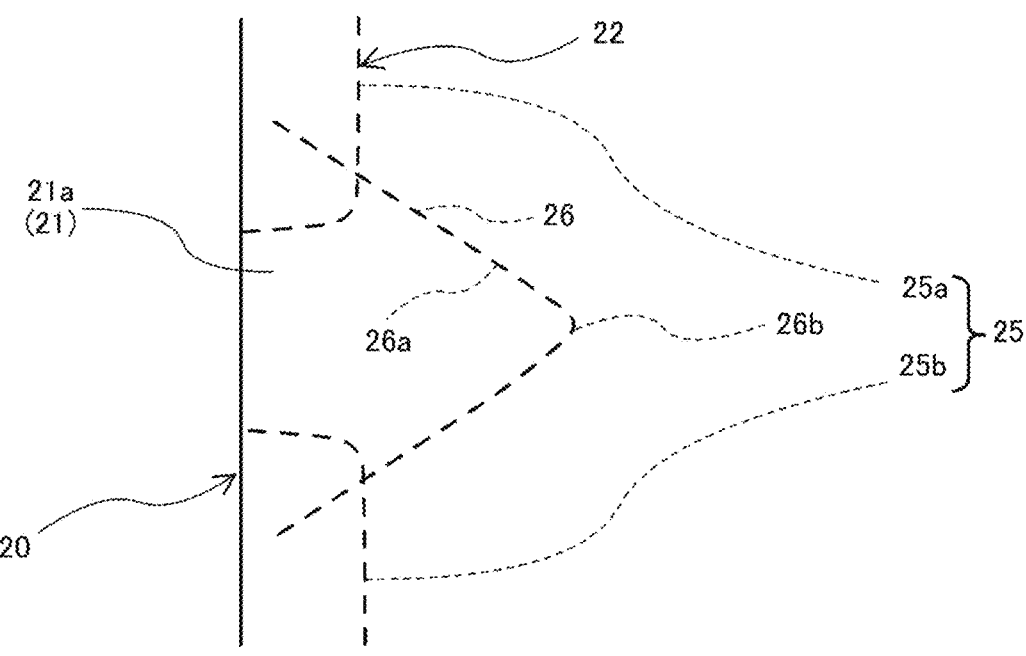

The convex portion 26a may be formed in a curved shape as a whole, or may have a corner portion 26b bent in the middle of the convex portion 26a such that stress is easily concentrated when the internal pressure of the airbag 20 increases (see FIG. 9). An angle formed by the corner portion 26b is, for example, in a range of 90° to 150°, which is effective in promoting stress concentration on the fragile sewn portion 26.

As described above, the airbag 20 includes the outer peripheral sewn portions 22 where the front-side panel 21a and the back-side panel 21b are sewn together in the state where the inflow port 23 is formed. According to this configuration, since the bag-shaped airbag 20 can be manufactured by sewing the plurality of panels 21 together, the airbag 20 can be manufactured with a simple material and at low cost.

When the inflation fluid generated by the high-pressure generation source 12 flows into the airbag 20 from the inflow port 23 at the time of a vehicle collision, the airbag 20 is deployed and inflated from the folded state in the case 10 and protrudes from the opening 11 of the case 10 to cover the upper surface of the front pillar 2. According to this configuration, since the airbag 20 can be interposed between the front pillar 2 and the pedestrian at the time of the vehicle collision with the pedestrian, the pedestrian can be protected. Further, according to the bag-shaped airbag 20, since the desired three-dimensional shape can be quickly formed at the time of deployment and inflation, the pedestrian protection performance at the time of the vehicle collision can be improved.

The outer peripheral sewn portion 22 includes the general sewn portion 25 and the fragile sewn portion 26 that is more easily broken than the general sewn portion 25. In this configuration, after the internal pressure of the airbag 20 starts to increase due to the inflow of the inflation fluid, the airbag 20 continues to absorb the impact of the pedestrian without breakage until the internal pressure of the airbag 20 reaches the predetermined pressure P due to the input of the pedestrian to the airbag 20. When the internal pressure of the airbag 20 reaches the predetermined pressure P, the stitches of the fragile sewn portion 26 are torn and the fragile sewn portion 26 is broken, and thus the inflation fluid in the bag of the airbag 20 is released to the outside of the airbag 20 via the vent hole portion 28.

Therefore, according to the airbag 20, when the airbag 20 is deployed and inflated due to the vehicle collision and the pedestrian is input to the airbag, the impact of the pedestrian can be absorbed in an initial stage of the pedestrian input. Further, the fragile sewn portion 26 is broken in a later stage of the pedestrian input after the pedestrian input continues and the internal pressure of the airbag 20 increases, so that the internal pressure of the airbag 20 can be reduced. Therefore, in the later stage of the pedestrian input, since the impact on the pedestrian can be alleviated by preventing the repulsion of the airbag 20 due to the pedestrian input, pedestrian protection performance can be improved.

Further, in the airbag 20, the fragile sewn portion 26 of the outer peripheral sewn portion 22 has the convex portion 26a formed to protrude toward the inside of the bag. In this configuration, when the internal pressure of the airbag 20 increases due to the inflow of the inflation fluid and the airbag 20 is deployed and inflated, the stress is easily concentrated on the convex portion 26a of the fragile sewn portion 26 as compared with the general sewn portion 25. In particular, since the convex portion 26a has the corner portion 26b bent in the middle of the convex portion 26a, the stress is more likely to be concentrated.

Therefore, according to the airbag 20, it is possible to improve vulnerability at the fragile sewn portion 26, and it is possible to promote breakage at the fragile sewn portion 26 at the time of pedestrian input after the deployment and inflation.

Second Embodiment

Next, a pedestrian airbag device according to a second embodiment of the present disclosure will be described with reference to FIGS. 10 to 19. In the present embodiment, as illustrated in FIGS. 10, 11, 16, and 17, two pedestrian airbag devices ML and MR mounted below both left-right end sides in the vicinity of a rear end 8a of a hood panel 8 of a vehicle V will be described as an example of the pedestrian airbag device. In the present specification, unless otherwise specified, front-rear, upper-lower, and left-right directions coincide with front-rear, upper-lower, and left-right directions in the vehicle V, respectively.

Since the two pedestrian airbag devices ML and MR have the same configuration and are symmetrically disposed, the pedestrian airbag device ML disposed on the left side will be described as an example in the present embodiment, and the pedestrian airbag device MR on the right side will not be described in detail. In the present embodiment, when the pedestrian airbag devices ML and MR are operated, the rear end 8a of the hood panel 8 is lifted upward by an actuator (not illustrated) (see FIGS. 11, 17, 19A, and 19B).

Figure 10:
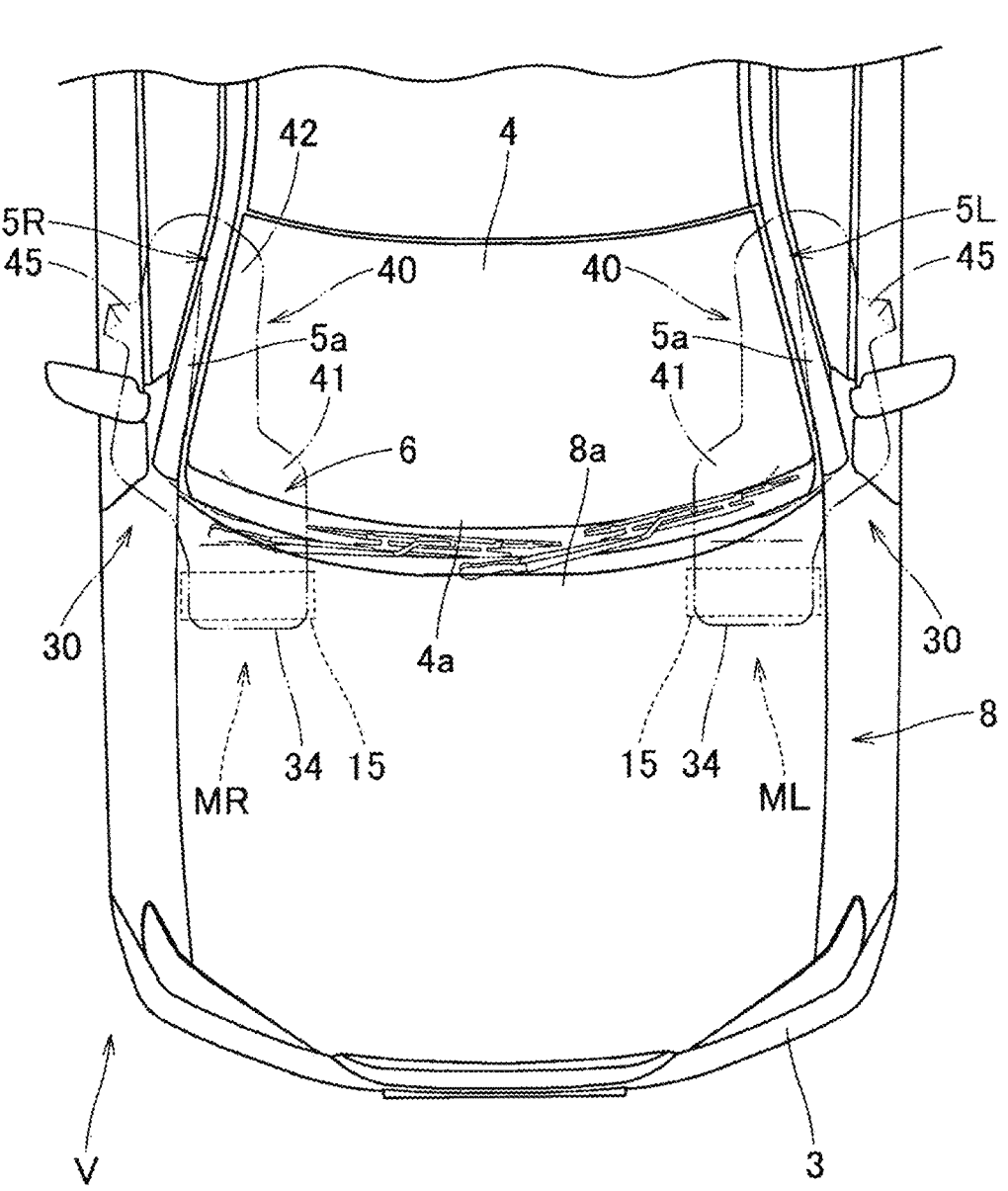
FIG. 10 is a plan view of a vehicle equipped with pedestrian airbag devices according to a second embodiment.
Figure 11:
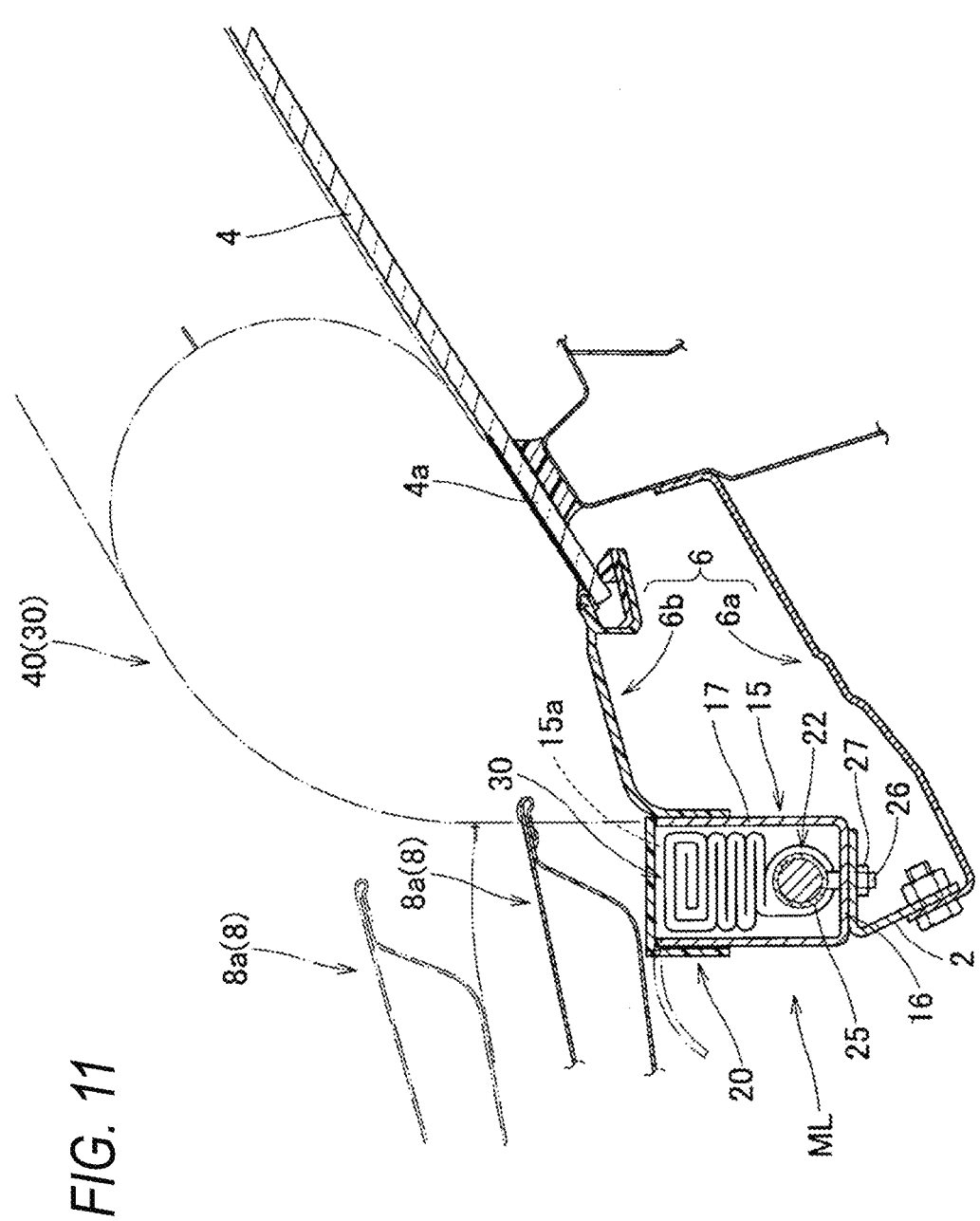
FIG. 11 is a schematic longitudinal cross-sectional view illustrating the pedestrian airbag device of the second embodiment.

As illustrated in FIGS. 10 and 11, the pedestrian airbag device ML is disposed adjacent to a cowl 6 that is a rear region of an engine room (reference numeral omitted), and includes an airbag 30, an inflator 22 that supplies inflation gas to the airbag 30, a case 15 as a storage portion that stores the folded airbag 30 and the inflator 22, and an airbag cover 20 that covers the folded airbag 30. The cowl 6 includes a cowl panel 6a having high rigidity on a body 1 side and a cowl louver 6b made of a synthetic resin above the cowl panel 6a, and specifically, the pedestrian airbag device ML is disposed adjacent to a position on a front side of the cowl louver 6b (see FIG. 11).

The case 15 serving as the storage portion is made of metal (sheet metal) and is fixed to an attachment portion 2 including a flange extending from the cowl panel 6a on the body 1 side of the vehicle V by using bolts 26 and nuts 27 of attachment brackets 25 of the inflator 22 (see FIG. 11). The case 15 has a substantially rectangular parallelepiped box shape having a protruding opening 15a for protruding the airbag 30 at the time of inflation on an upper end side, and includes a substantially rectangular plate-shaped bottom wall portion 16 extending substantially along the left-right direction (vehicle width direction) of the vehicle V, and a substantially rectangular tubular peripheral wall portion 17 extending upward from an outer peripheral edge of the bottom wall portion 16. The case 15 is disposed in the vicinity of the rear end 8a of the hood panel 8, specifically, on a front end side of the cowl 6 below the rear end 8a of the hood panel 8.

The airbag cover 20 extends forward from the cowl louver 6b substantially flush with the cowl louver 6b so as to cover the protruding opening 15a of the case 15, and in the case of the present embodiment, is attached to a portion on a front side of the peripheral wall portion 17 in the case 15. The airbag cover 20 is pushed open by the airbag 30 when the airbag 30 stored in the case 15 is inflated (see the two-dot chain line in FIGS. 11 and 17).

Figure 13:
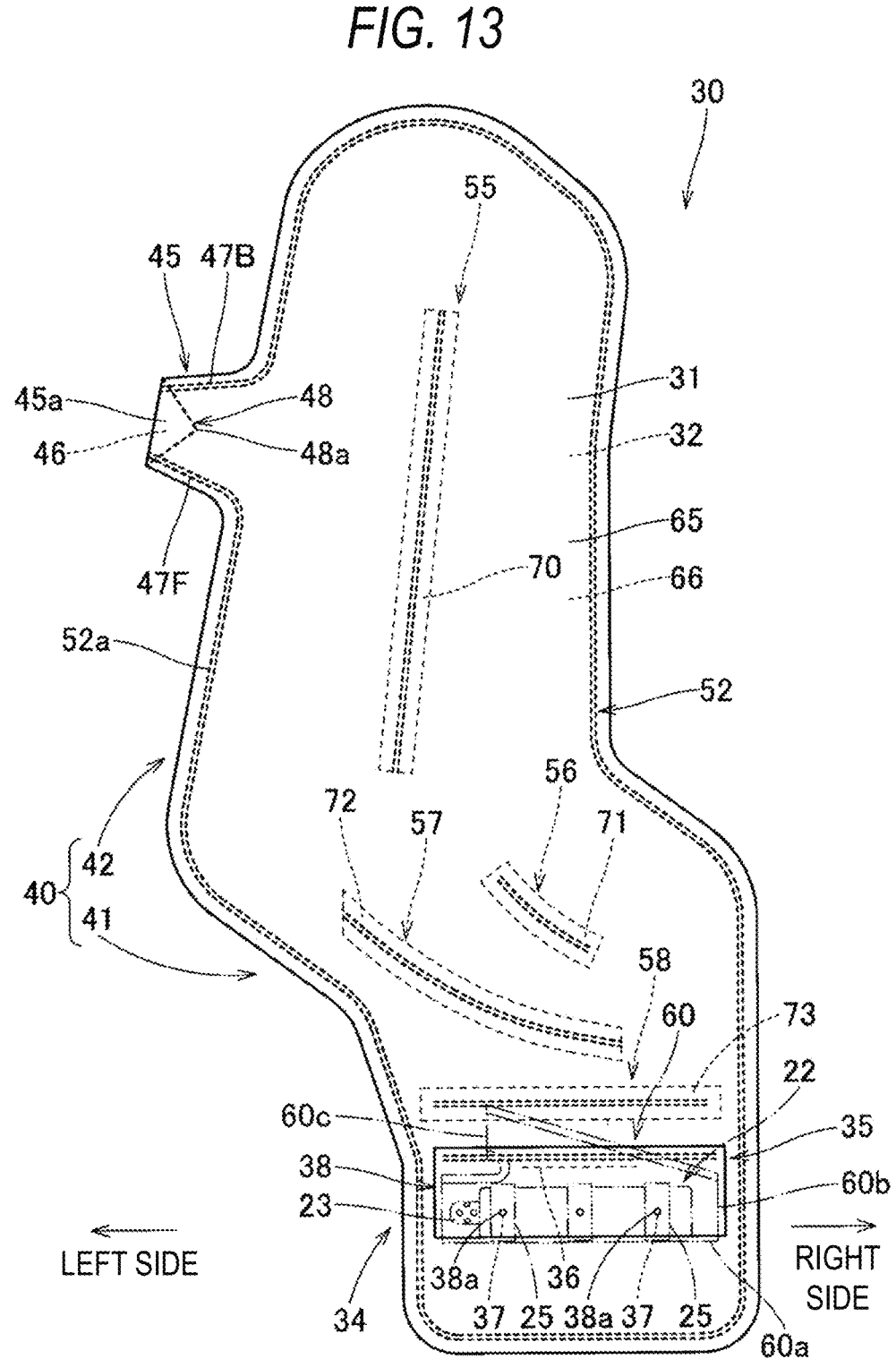
FIG. 13 is a bottom view of the airbag of FIG. 12.

As illustrated in FIGS. 11 and 13, the inflator 22 has a substantially columnar shape in which an axial direction is disposed substantially along the left-right direction (vehicle width direction) of the vehicle V, and a gas discharge portion 23 that discharges the inflation gas is disposed on a tip end side (left end side in the case of the present embodiment). In the case of the present embodiment, the inflator 22 is inserted into the airbag 30 (specifically, into a case-side portion 34 to be described later) in a state where an outer peripheral side thereof is held by the plurality of (three in the case of the present embodiment) attachment brackets 25 and the periphery thereof is surrounded by an inner tube 60, and is fixed to the bottom wall portion 16 of the case 15 by using bolts 26 of the attachment brackets 25 (see FIG. 17). As described above, the bolt 26 of the attachment bracket 25 passes through the bottom wall portion 16 and is inserted into the nut 27 on the attachment portion 2 on the body 1 side of the vehicle V, thereby fixing the case 15 to the attachment portion 2 together with the inflator 22 (see FIG. 11). Since the inflator 22 is inserted into the airbag 30, the airbag 30 is also attached and fixed to the bottom wall portion 16 of the case 15 when the attachment bracket 25 is attached to the attachment portion 2. The inflator 22 is configured to operate when a sensor (not illustrated) provided in a front bumper 3 of the vehicle V detects a collision between the vehicle V and the pedestrian P.

Figure 15:
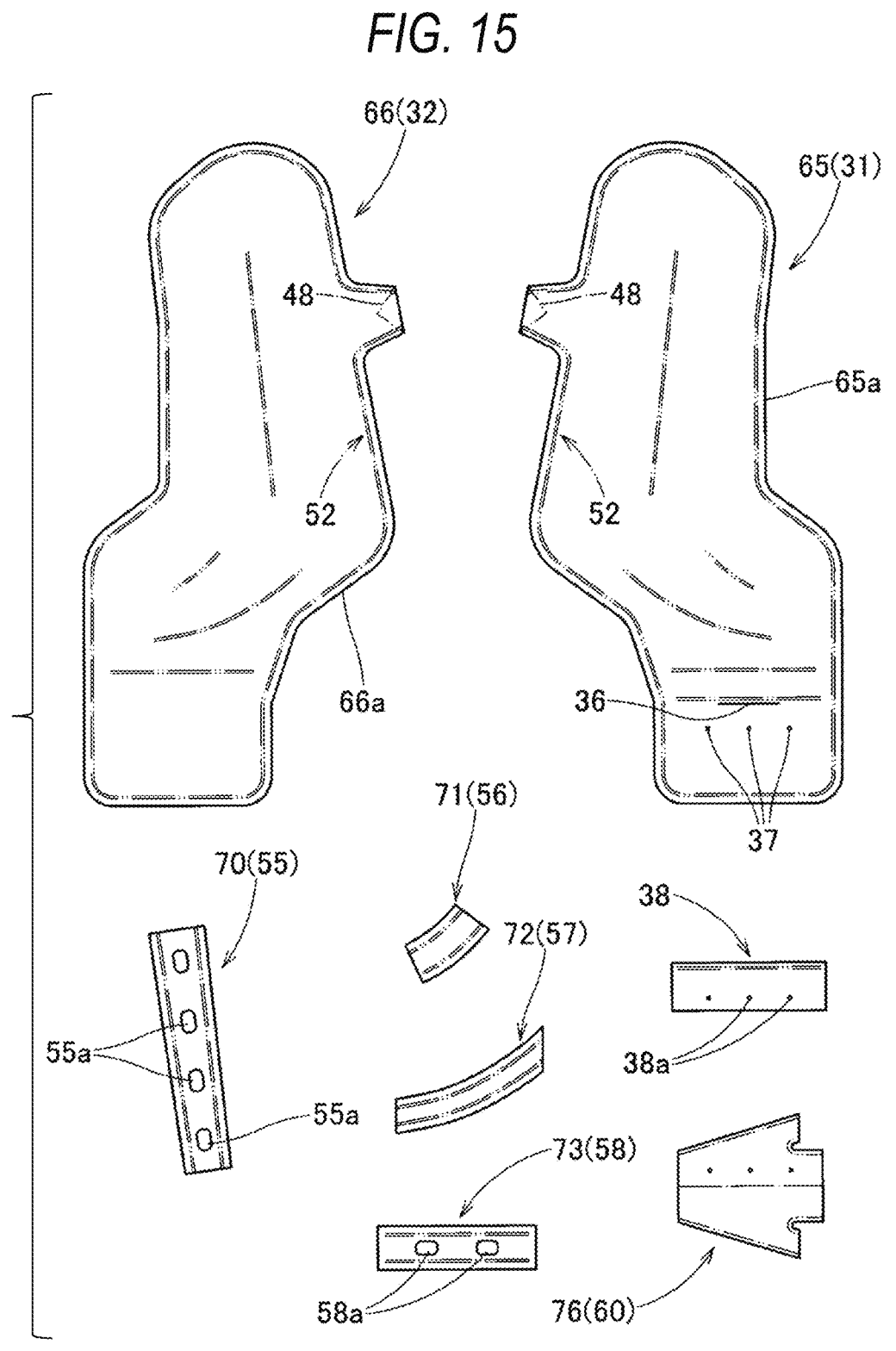
Figure 16:
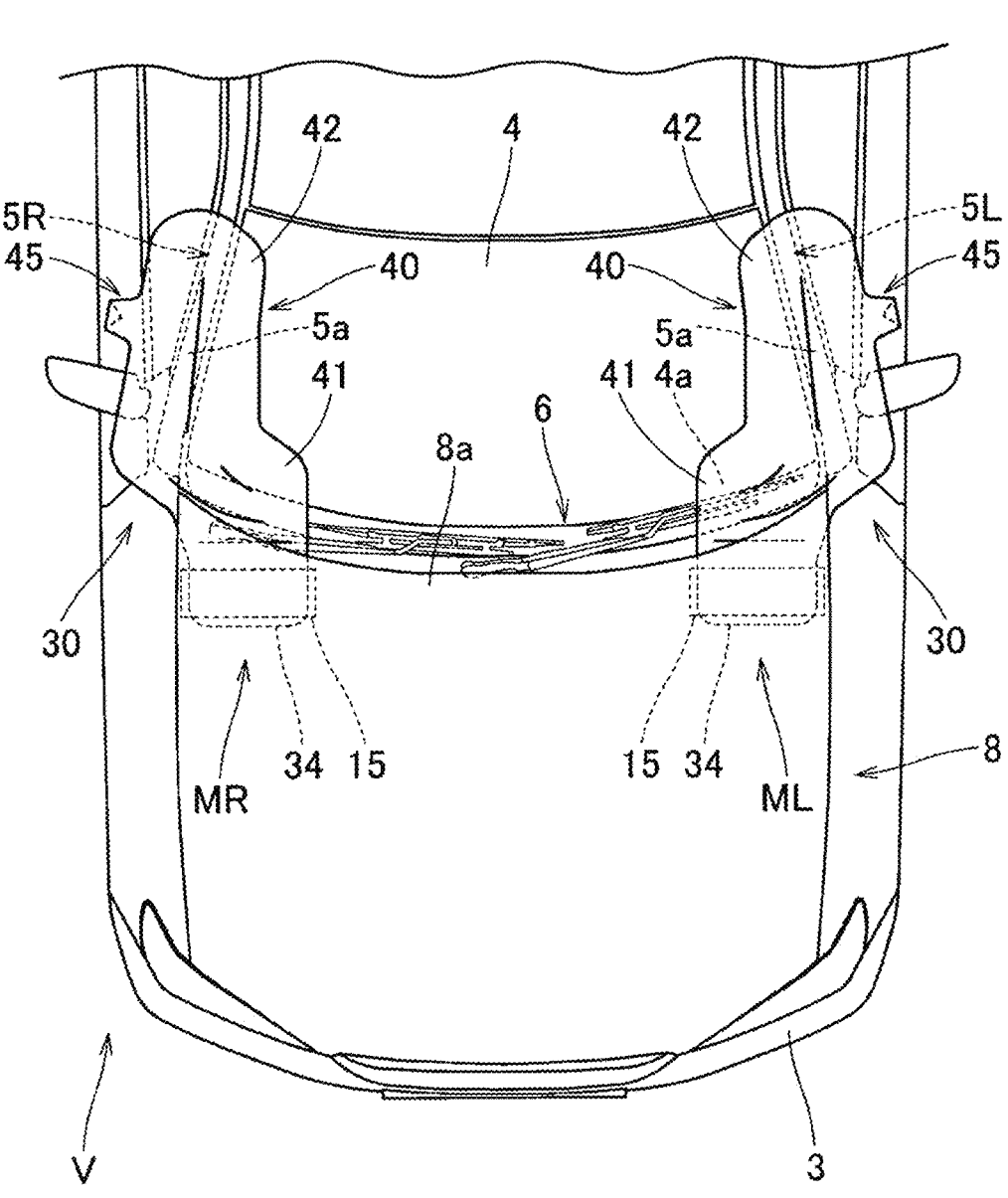
FIG. 16 is a plan view of the vehicle illustrating a state where the airbags are completely inflated in the pedestrian airbag devices of the second embodiment.

As illustrated in FIG. 16 and the two-dot chain line of FIGS. 10 and 11, the airbag 30 includes the case-side portion 34 disposed from a case 15 side to a lower surface side of the rear end 8a of the hood panel 8 at the time of completion of inflation, a protection main body portion 40 extending rearward from the case 15 at the time of completion of inflation and capable of receiving the pedestrian P, and a gas-exhaust portion 45 formed to be continuous from the protection main body portion 40. Further, as illustrated in FIGS. 12, 13, and 15, the airbag 30 includes a vehicle body side wall portion 31 (vehicle body side panel 65) disposed on the lower surface side which becomes the body 1 side at the time of completion of inflation, and a pedestrian side wall portion 32 (pedestrian side panel 66) disposed on an upper surface side that becomes a pedestrian side facing the vehicle body side wall portion 31, both the vehicle body side wall portion 31 and the pedestrian side wall portion 32 having substantially the same outer shape, and is formed in a bag shape by joining (sewing) outer peripheral edges of the vehicle body side wall portion 31 and the pedestrian side wall portion 32 (outer peripheral edges 65a and 66a of the vehicle body side panel 65 and the pedestrian side panel 66) over substantially an entire periphery (over an entire periphery excluding the region of an opening 46 to be described later in the gas-exhaust portion 45).

Figure 17:
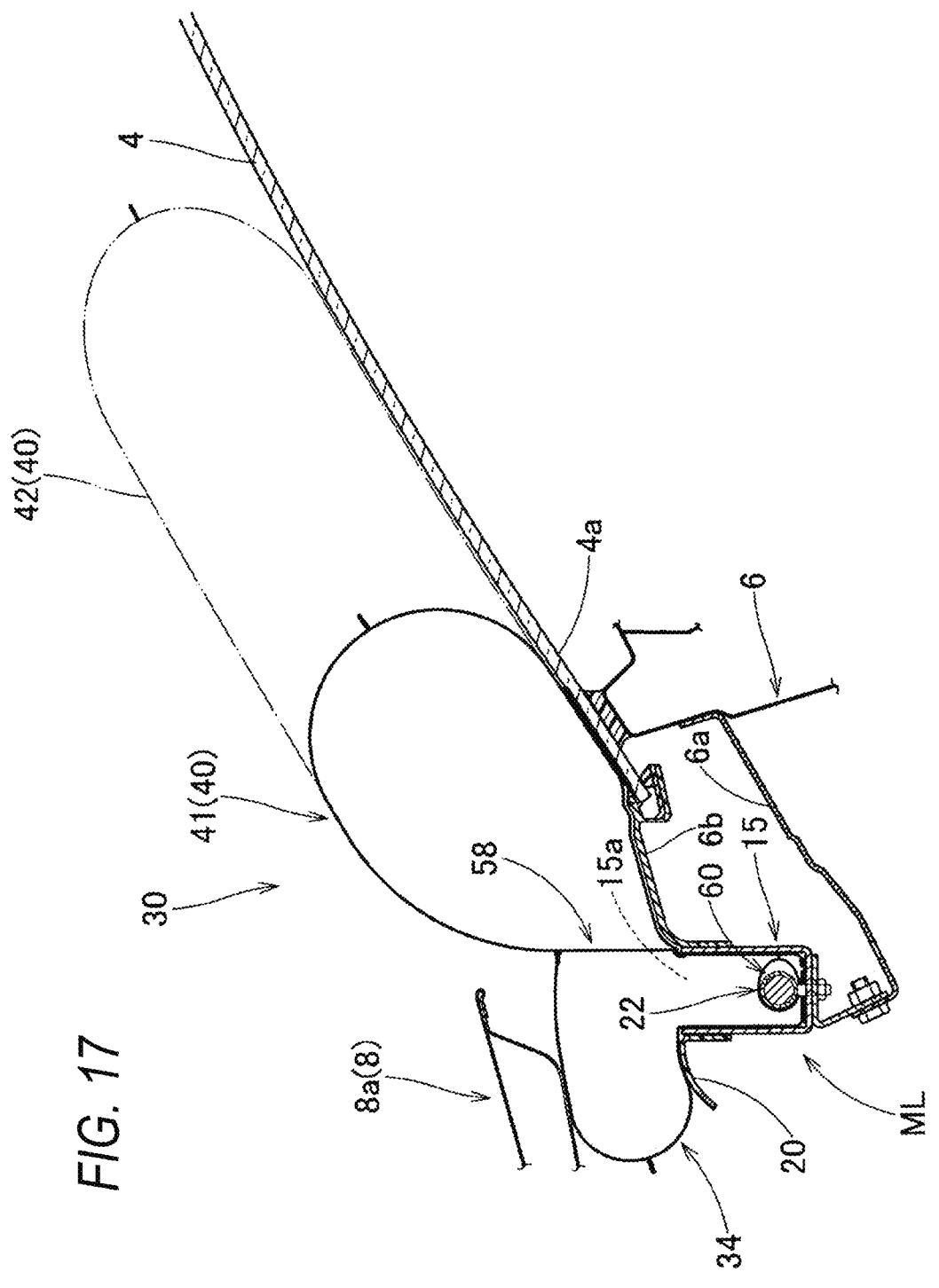
FIG. 17 is a schematic longitudinal sectional view illustrating a state where the left airbag is completely inflated in the pedestrian airbag device of the second embodiment.
Figure 18:
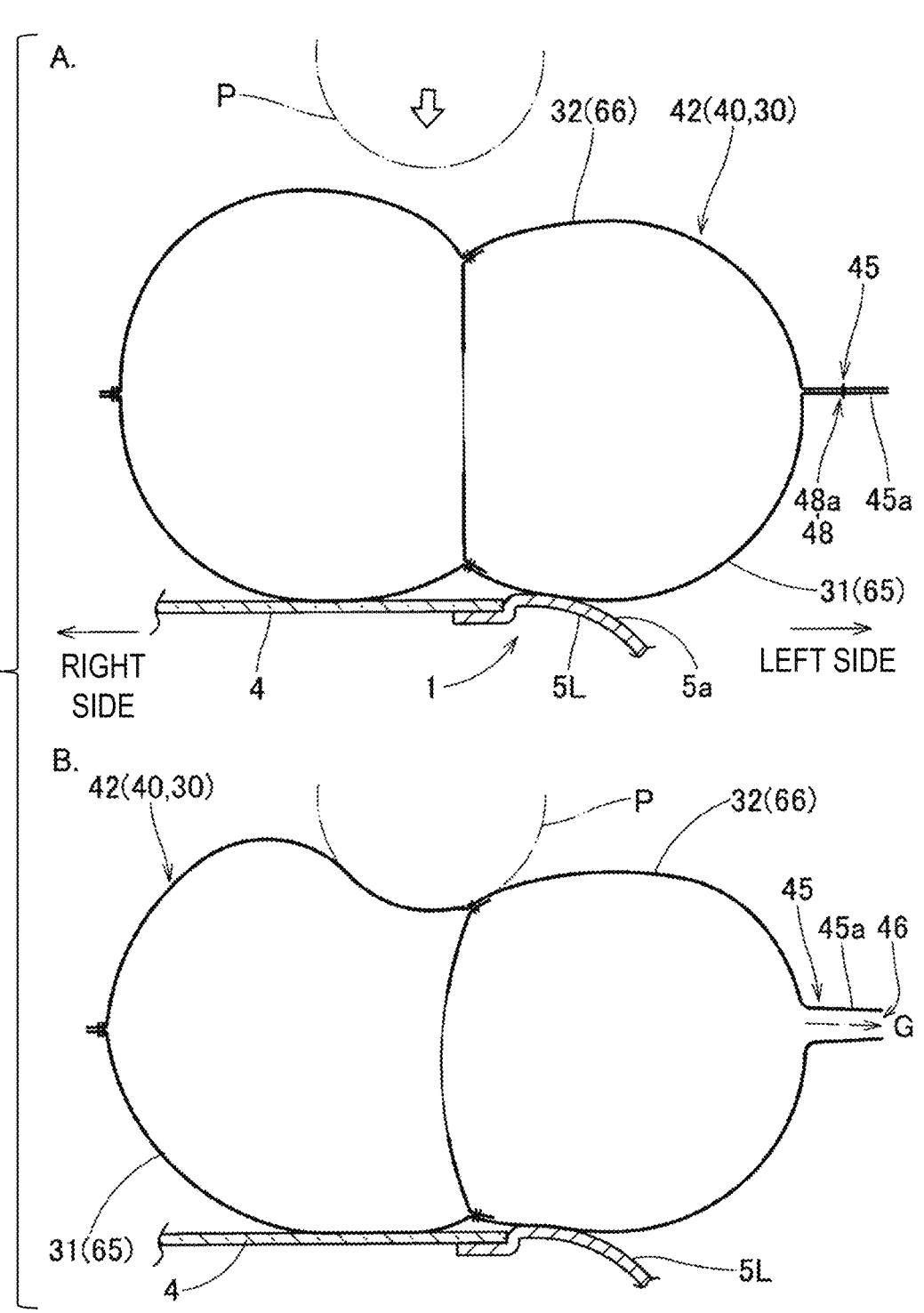
FIG. 18 is partially enlarged schematic cross-sectional views respectively illustrating states before and after the gas-exhaust portion continuous from a protection main body portion is opened in the pedestrian airbag device of the second embodiment.
Figure 19:
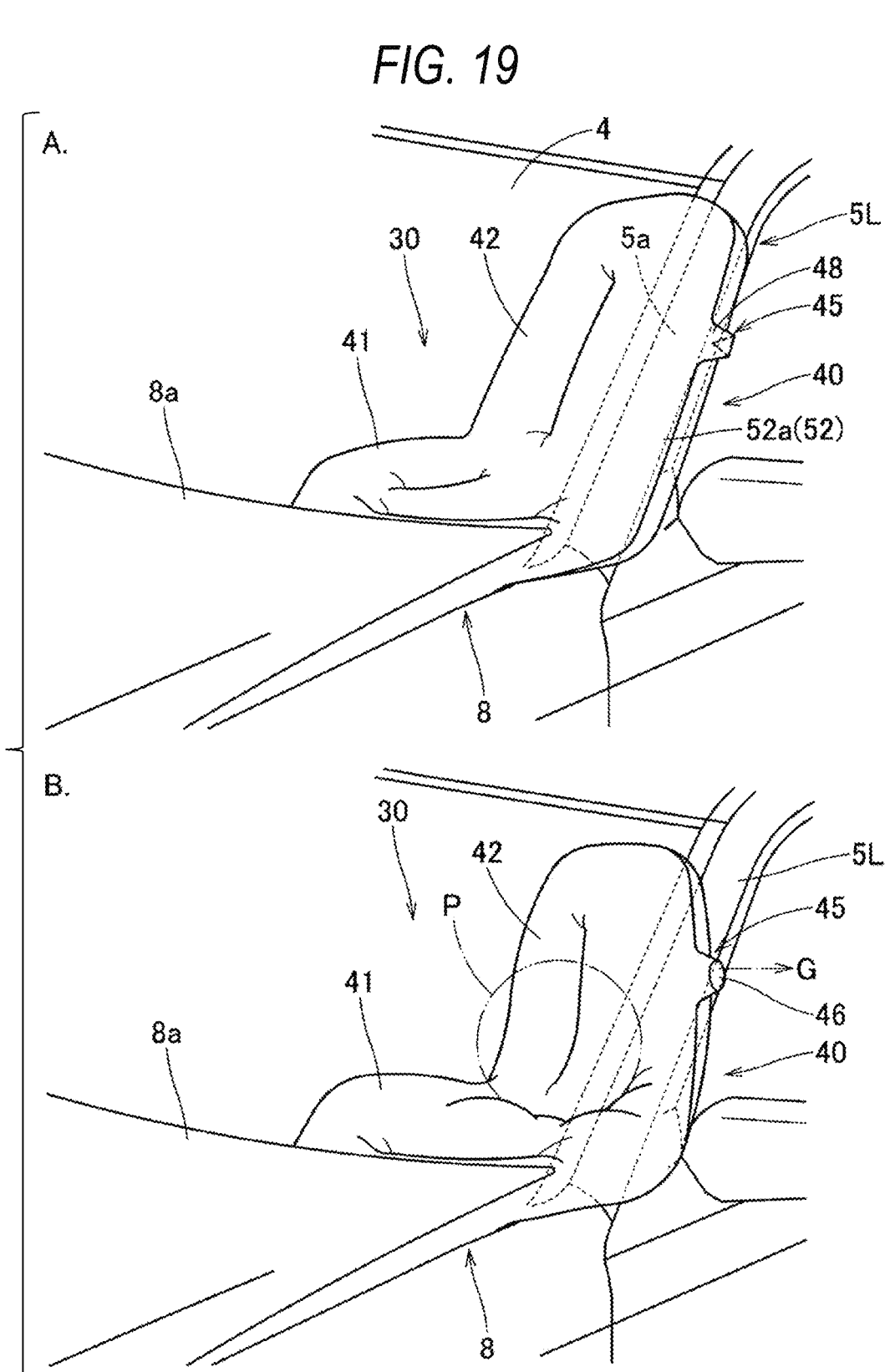
FIG. 19 is schematic partial enlarged perspective views illustrating a state where inflation of the left airbag is completed in the pedestrian airbag device of the second embodiment, and respectively illustrate states before and after a pedestrian is received.

The case-side portion 34 is formed to extend forward from a cowl cover portion 41 to be described later in the protection main body portion 40, and is attached to the case 15 at a portion on a rear end side (protection main body portion 40 side) at the time of completion of inflation, and is configured to cover the upper side of a region on a front side from immediately above the case 15, that is, a lower side in the vicinity of the rear end 8a of the hood panel 8 at the time of completion of inflation (see FIG. 17). In the case of the present embodiment, the case-side portion 34 is configured to have a slightly narrower width (set to have a smaller width dimension in the left-right direction) than the cowl cover portion 41 in the protection main body portion 40, and to have an inner edge (right edge in the present embodiment) on a vehicle width direction side substantially coincide with an inner edge (right edge) of the cowl cover portion 41. In the vehicle body side wall portion 31, an insertion opening portion 35 for inserting the inflator 22 therein is formed in a region constituting the rear end side of the case-side portion 34 (see FIG. 13). The insertion opening portion 35 includes an insertion slit 36 for inserting the inflator 22 into the airbag 30 in a state where the outer peripheral side of the inflator 22 is wrapped by the inner tube 60, insertion holes 37 for inserting the bolts 26 of the attachment brackets 25, and a lid panel 38 for closing the insertion slit 36 from the outer peripheral side. The insertion slit 36 is formed substantially linearly along the left-right direction, and the insertion hole 37 is formed in a region in front of the insertion slit 36 (see FIGS. 13 and 15). The lid panel 38 covers an outer surface side of the insertion slit 36, a rear edge side thereof is joined (sewn) to the vehicle body side wall portion 31 behind the insertion slit 36, and attachment holes 38a for protruding the bolts 26 of the attachment brackets 25 are disposed on a front end side thereof corresponding to the insertion holes 37 (see FIGS. 13 and 15).

The protection main body portion 40 is a portion that is disposed to cover a region near the hood panel 8 when the inflation of the airbag 30 is completed, specifically, as illustrated in FIGS. 16 and 19A, from an upper surface of the cowl 6 near the rear end 8a of the hood panel 8 to a front surface 5a (upper surface) of the front pillar 5L, and is capable of receiving the pedestrian P. Specifically, as illustrated in FIGS. 12 and 13, the protection main body portion 40 is formed to extend rearward and leftward from the case-side portion 34 in a state where the airbag 30 is flatly deployed, and includes the cowl cover portion 41 disposed substantially along the left-right direction behind the case-side portion 34, and a pillar cover portion 42 extending rearward from an outer end portion (left end) of the cowl cover portion 41 in the vehicle width direction. In the case of the present embodiment, the cowl cover portion 41 is formed to extend only leftward (outward in the vehicle width direction) from a rear side of the case-side portion 34, and is configured to cover a rear end 8a side of the hood panel 8 when the inflation of the airbag 30 is completed, mainly, an upper surface side in the vicinity of an end edge (left end) in the vehicle width direction of the portion from the cowl 6 to a lower portion 4a side of a front windshield 4 (see FIGS. 16 and 17). The pillar cover portion 42 is configured to cover an upper surface (front surface 5a) side of the left front pillar 5L over substantially the entire region in the front-rear direction when the inflation of the airbag 30 is completed (see FIGS. 15 and 19A). In the case of the present embodiment, the pillar cover portion 42 is configured to have a width dimension that gradually decreases such that when the airbag 30 is flatly deployed, a front end side facing a case-side portion 34 side is wide, and the width becomes slightly narrow toward a rear end (FIGS. 12 and 13).

Figure 12:
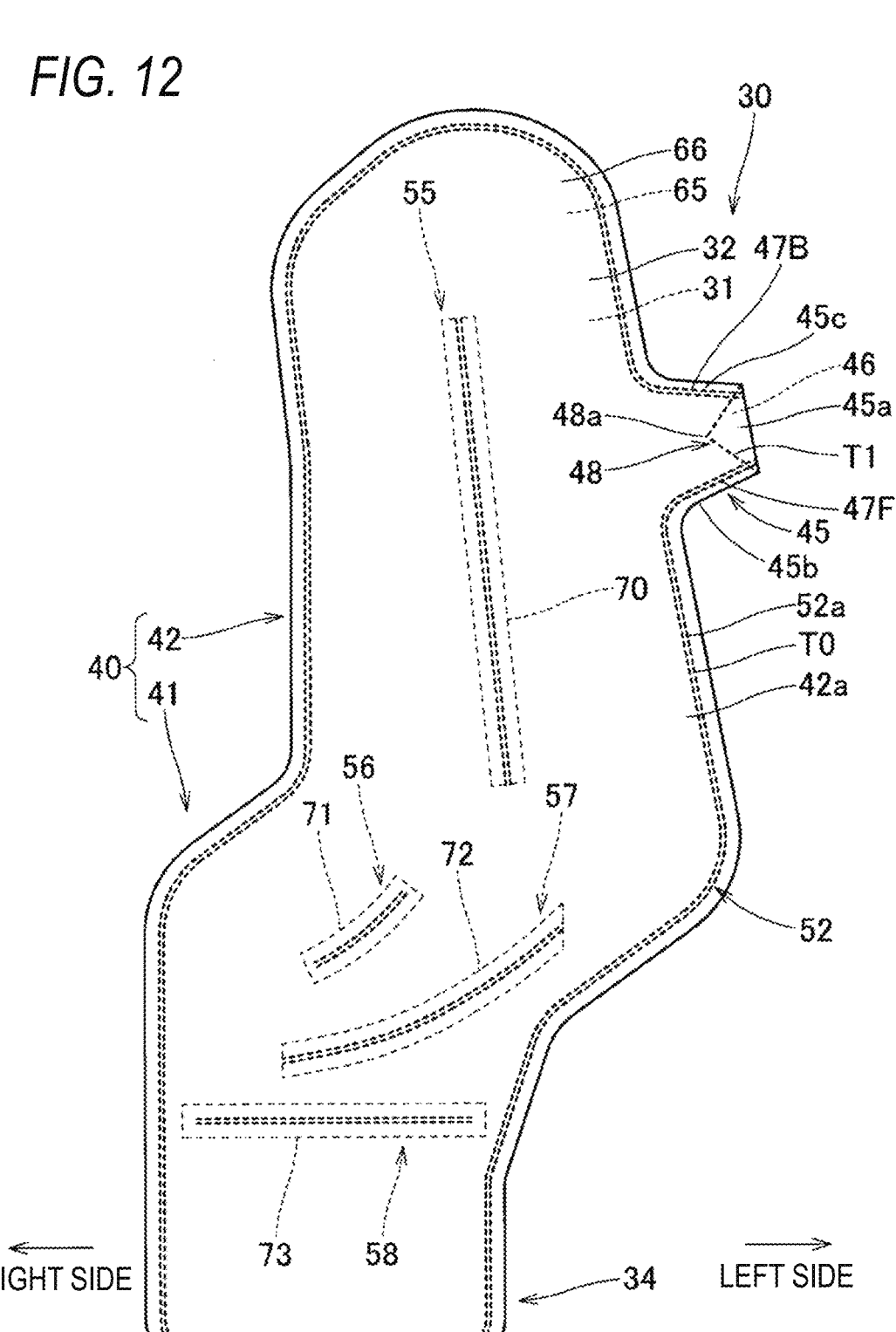
FIG. 12 is a plan view of an airbag used in the pedestrian airbag device according to the second embodiment in a flatly deployed state.

The gas-exhaust portion 45 formed to be continuous from the protection main body portion 40 is configured to open when the pedestrian P is received and to be able to exhaust the inflation gas G flowed into the protection main body portion 40, and in the case of the present embodiment, as illustrated in FIGS. 12, 13, and 16, is formed to protrude leftward from a left edge 42a side of the pillar cover portion 42. Specifically, in the case of the present embodiment, the gas-exhaust portion 45 is formed at a position slightly behind the center of the pillar cover portion 42 in the front-rear direction. In the present embodiment, the airbag 30 is formed in the bag shape by sewing (joining) the outer peripheral edges 65a and 66a of the vehicle body side panel 65 and the pedestrian side panel 66, which are set to have the same outer shape, each other over the entire periphery excluding a tip end 45a of the gas-exhaust portion 45 using a sewing thread. In other words, in the airbag 30 of the present embodiment, the gas-exhaust portion 45 is disposed to protrude outward (leftward) from an outer peripheral edge sewn portion 52 (specifically, a left edge side portion 52a constituting a left edge 42a of the pillar cover portion 42) as an outer peripheral edge joint portion constituting an outer peripheral edge of the protection main body portion 40 (disposed on an outer peripheral edge side) (see FIGS. 12 to 14). More specifically, the gas-exhaust portion 45 is constituted by a region that does not include the outer peripheral edge sewn portion 52 and protrudes leftward (outward) from the outer peripheral edge sewn portion 52 including a front edge constituent portion 47F and a rear edge constituent portion 47B to be described later. Specifically, the gas-exhaust portion 45 has a substantially trapezoidal shape with a tapered outer shape in a state where the airbag 30 is flatly deployed. A front edge 45b side and a rear edge 45c side of the gas-exhaust portion 45 are closed by the front edge constituent portion 47F and the rear edge constituent portion 47B, respectively, which are disposed to be continuous from the outer peripheral edge sewn portion 52 constituting the outer peripheral edge of the protection main body portion 40. A tip end 45a side of the gas-exhaust portion 45 is configured such that a sewn portion continuous from the outer peripheral edge sewn portion 52 (that is, the front edge constituent portion 47F and the rear edge constituent portion 47B) is not disposed over the entire region. The tip end 45a side of the gas-exhaust portion 45 is closed by joining (sewing) the vehicle body side panel 65 and the pedestrian side panel 66 by a sewn portion 48 as a temporary joint portion (see FIG. 14). The sewn portion 48 as the temporary joint portion can be released from a joining state by receiving an increase in the internal pressure of the protection main body portion 40 when the pedestrian is received.

Figure 14:
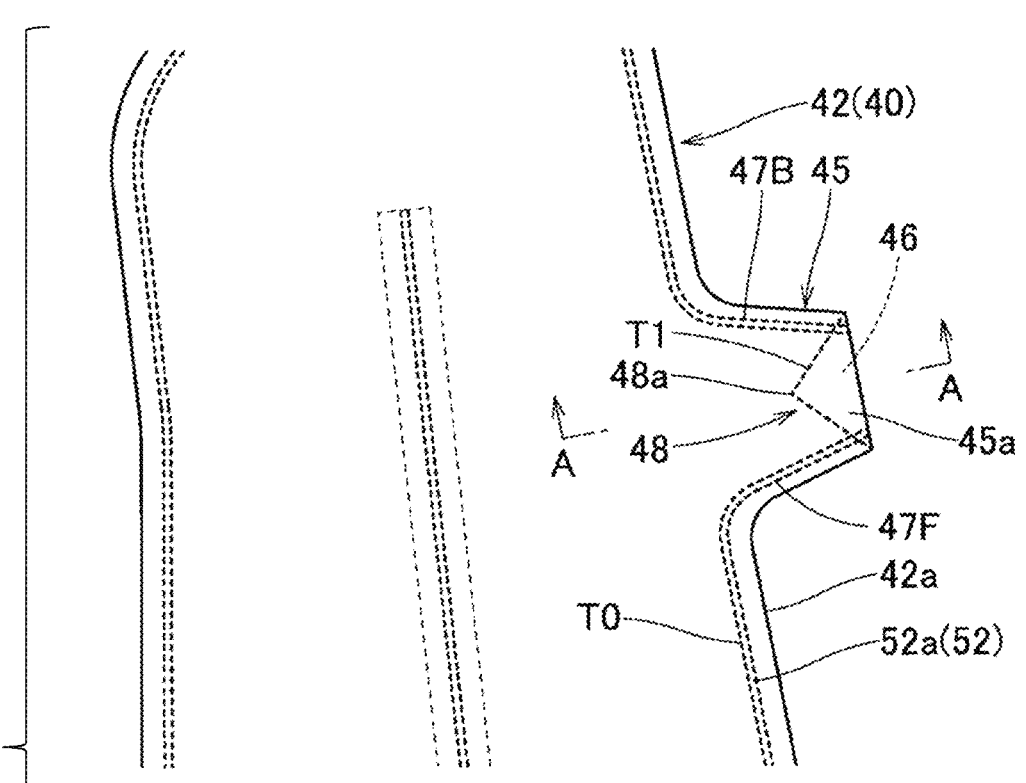
FIG. 14 illustrates partially enlarged plan views illustrating the vicinity of a gas-exhaust portion in the airbag of FIG. 12.
Figure 14:
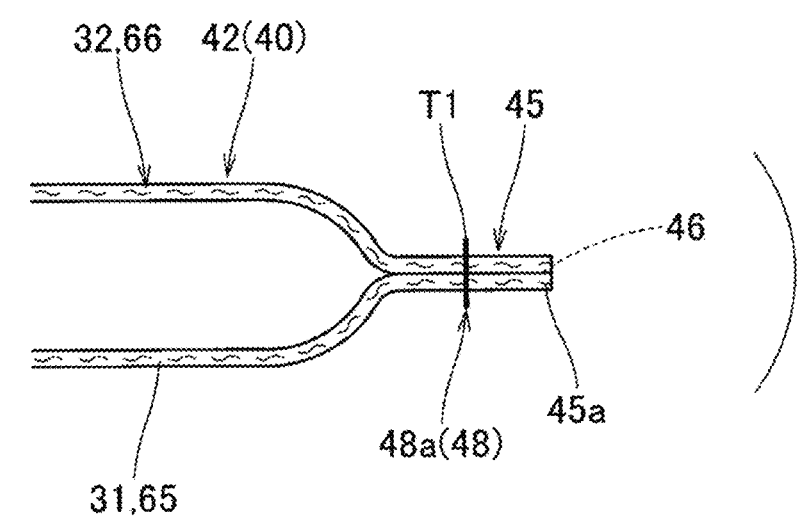

When the flatly deployed airbag 30 is viewed from above, the sewn portion 48 as the temporary joint portion is disposed to close the tip end 45a side of the gas-exhaust portion 45 over the entire length, and has a substantially wedge shape in which an intermediate portion protrudes leftward (toward the cowl cover portion 41). As illustrated in FIG. 14, a protruding end 48a at the intermediate portion of the sewn portion 48 is configured to be located on the left-right outer side (left side) of the left edge side portion 52a constituting the left edge 42a of the pillar cover portion 42 in the outer peripheral edge sewn portion 52. The protruding end 48a of the sewn portion 48 constitutes a starting point portion that becomes a starting point of breakage when the internal pressure increases. When the internal pressure of the protection main body portion 40 increases when the pedestrian P is received, the sewn portion 48 serving as the temporary joint portion causes stress concentration at the portion of the protruding end 48a (starting point portion), and breaks a sewing thread (low-strength thread T1 to be described later) in the vicinity of the protruding end 48a (starting point portion), thereby causing coming-off of the thread and releasing the joining state between the vehicle body side panel 65 and the pedestrian side panel 66, and by releasing the sewn state of the sewn portion 48, the opening 46 is formed on the tip end 45a side of the gas-exhaust portion 45, and the inflation gas G is exhausted from the opening 46 (see scene B in FIG. 18 and scene B in FIG. 19).

In the airbag 30 of the present embodiment, in the sewn portion 48 serving as the temporary joint portion, a timing of breakage at the protruding end 48a (starting point portion) (that is, a timing at which the inflation gas G begins to be exhausted) can be appropriately set by varying a pitch of the stitches and the strength of the sewing thread to be used. Specifically, in the case of the present embodiment, the sewn portion 48 is formed in a single line shape, and is formed using a sewing thread (low-strength thread T1) that is weaker in strength than a sewing thread (high-strength general sewing thread T0) constituting the outer peripheral edge sewn portion 52 (outer peripheral edge joint portion) disposed in a double line shape on an outer peripheral edge side of the airbag 30. Further, in the airbag 30 of the present embodiment, the exhaust amount of the inflation gas G can be appropriately set by changing the shape of the tip end 45a side of the gas-exhaust portion 45.

Tethers 55, 56, 57, and 58 that connect the pedestrian side wall portion 32 and the vehicle body side wall portion 31 to restrict the thickness when the inflation is completed are disposed inside the airbag 30. Specifically, the tether 55 is disposed within the region of the pillar cover portion 42 except for the vicinity of the rear end, and more specifically, is continuously disposed to extend along a length direction (front-to-rear direction) of the pillar cover portion 42 at a substantially central position in the width direction (that substantially coincides with the vehicle width direction) of the pillar cover portion 42. In the tether 55, a plurality of (four in the case of the present embodiment) openings 55a through which inflation gas can be inserted are arranged side by side in the front-rear direction (see FIG. 15). The tether 56 is partially disposed at a substantially central position in the front-rear and left-right directions in the cowl cover portion 41. The tether 57 extends leftward and rightward at a position near a front edge of the cowl cover portion 41. The tether 57 is disposed at a position near the rear end 8a of the hood panel 8 when the inflation of the airbag 30 is completed. The tether 58 is disposed substantially along the left-right direction in the vicinity of a boundary portion between the case-side portion 34 and the cowl cover portion 41 (protection main body portion 40) so as to partially close the boundary portion, and a plurality of (two in the case of the present embodiment) openings 58a through which the inflation gas can be inserted are arranged side by side in the left-right direction (see FIG. 15).

As illustrated by the two-dot chain line in FIG. 13, the inner tube 60 covering the outer peripheral side of the inflator 22 has an insertion tubular portion 60a into which the inflator 22 to which the attachment bracket 25 has been attached is inserted, and is configured as a substantially trifurcated tubular shape in which outflow ports 60b and 60c extending to both sides from an arrangement portion of the gas discharge portion 23 in the insertion tubular portion 60a and allowing the inflation gas to flow out to a tip end side are disposed. An attachment hole (reference numeral omitted) through which the bolt 26 of each attachment bracket 25 passes is formed in the insertion tubular portion 60a. The inner tube 60 is formed of a tube base material 76 as illustrated in FIG. 15.

As illustrated in FIG. 15, the airbag 30 of the present embodiment includes the vehicle body side panel 65 constituting the vehicle body side wall portion 31, the pedestrian side panel 66 constituting the pedestrian side wall portion 32, tether base materials 70, 71, 72, and 73 constituting tethers 55, 56, 57, and 58, respectively, and the tube base material 76 constituting the inner tube 60. These base materials are formed by cutting a coated fabric into a predetermined shape, the coated fabric being obtained by applying a coating agent for gas leakage prevention to a surface of a woven fabric formed by weaving polyamide yarn, polyester yarn, or the like.

To describe mounting of the pedestrian airbag device ML of the present embodiment on the vehicle V, first, the airbag 30 is folded to be storable in the case 15, and the inflator 22 to which the attachment bracket 25 has been assembled is inserted into the inner tube 60, and in this state, the inflator 22 is inserted into the case-side portion 34 of the airbag 30 using the insertion slit 36. Then, the bolts 26 of the attachment brackets 25 protruding from the attachment holes (not illustrated) of the inner tube 60 are caused to protrude from the insertion holes 37 of the airbag 30, and then the lid panel 38 is closed to cover the insertion slits 36, and the bolts 26 are inserted into the attachment holes 38a. Thereafter, the airbag 30 and the inflator 22 are stored in the case 15, the airbag cover 20 is attached to the case 15, the bolts 26 protruding from the case 15 are screwed into the nuts 27 on the attachment portion 2, and the inflator 22 is connected to an operation circuit (not illustrated), allowing the pedestrian airbag device ML to be mounted on the vehicle V. The right pedestrian airbag device MR can also be mounted on the vehicle V in a similar manner.

In the pedestrian airbag devices ML and MR of the present embodiment, when the operation circuit (not illustrated) detects the collision between the vehicle V and the pedestrian (specifically, the pedestrian or a bicycle rider) based on the operation signal from the sensor (not illustrated) disposed in the front bumper 3, each of the inflators 22 and 22 is operated, and the airbags 30 and 30 cause the inflation gas to flow into the inside, and are inflated to cover a region from the vicinity of the left end and the right end on the rear end 8a side of the hood panel 8 to the upper surfaces (front surface 5a) sides of the front pillars 5L and 5R, respectively (see the two-dot chain line in FIGS. 10 and 11 and FIGS. 16, 17, and 19A).

In the pedestrian airbag device ML (MR) of the present embodiment, the gas-exhaust portion 45 capable of exhausting the inflation gas flowed into the protection main body portion 40 when the pedestrian P is received is disposed to protrude outward (leftward) from the outer peripheral edge joint portion (specifically, the left edge side portion 52a in the outer peripheral edge joint portion 52) constituting the outer peripheral edge of the protection main body portion 40 when the inflation of the airbag 30 is completed, and the gas-exhaust portion 45 is closed on a terminal (tip end 45a) side by the sewn portion 48 as the temporary joint portion formed by joining the vehicle body side panel 65 and the pedestrian side panel 66 in a region deviated outward (leftward) from the joint portion (left edge side portion 52a) (see FIGS. 12 to 14, and 16). Therefore, the gas-exhaust portion 45 (sewn portion 48) is less likely to be affected by the vicinity of the outer peripheral edge (outer peripheral edge sewn portion 52 disposed on the outer peripheral edge side) of the protection main body portion 40, and when the internal pressure in the protection main body portion 40 increases at the time of receiving the pedestrian, a force that releases the joining state between the pedestrian side panel 66 and the vehicle body side panel 65 can stably act on the sewn portion 48 as the temporary joint portion, and the joining state by the sewn portion 48 can be stably and quickly released. As a result, when the pedestrian P comes into contact with the protection main body portion 40 (airbag 30) at the time of inflation completion (see scene A in FIG. 18), the internal pressure in the protection main body portion 40 increases, and the terminal (tip end 45*a*) side of the gas-exhaust portion 45 can be stably opened so as to separate the pedestrian side panel 66 and the vehicle body side panel 65 from each other by releasing the joining state of the sewn portion 48 (see scene B in FIG. 18 and scene B in FIG. 19), and the inflation gas G in the protection main body portion 40 can be stably exhausted to the outside from the formed opening 46.

Therefore, in the pedestrian airbag device ML (MR) of the present embodiment, the inflation gas G can be stably exhausted from the airbag 30 when the pedestrian is received.

Further, in the pedestrian airbag device ML (MR) of the present embodiment, the temporary joint portion is config-ured by the sewn portion 48 where the vehicle body side panel 65 and the pedestrian side panel 66 are sewn together using the sewing thread (low-strength thread T1), and the sewn portion 48 includes the protruding end 48*a* that is disposed at the intermediate portion to protrude toward the protection main body portion 40 (pillar cover portion 42) side and serves as a starting point portion which is a starting point of breakage when the internal pressure increases. Therefore, in the pedestrian airbag device ML (MR) of the present embodiment, when the inflation of the airbag 30 is completed, the stress concentration can be generated in the vicinity of the protruding end 48*a* (starting point portion) of the sewn portion 48 constituting the temporary joint portion, the sewing thread (low-strength thread T1) can be quickly divided (cut) in the vicinity of the protruding end 48*a* (starting point portion), and the joining state (sewn state) by the temporary joint portion (sewn portion 48) can be quickly released due to the occurrence of coming-off of the thread or the like. The temporary joint portion is not limited to sewing using a sewing thread, and the temporary joint portion may be formed, for example, by bonding (adhering) using an adhesive, welding between panels, or the like. Even in the case where the temporary joint portion is formed by a method other than sewing, it is desirable to provide a starting point portion that serves as a starting point for releasing the joining state. In the airbag 30 of the present embodiment, the gas-exhaust portion 45 is disposed at the position slightly behind the center of the pillar cover portion 42 in the front-rear direction (a position near the rear end of the pillar cover portion 42), but the arrangement position of the gas-exhaust portion is not limited to the present embodi-ment. In consideration of the influence of the inflation gas exhausted from the gas-exhaust portion on the pedestrian, the gas-exhaust portion is preferably disposed at a position (in the present embodiment, near the rear end of the pillar cover portion) outside a region where the pedestrian mainly comes into contact with the airbag when the inflation is completed.

In the present embodiment, the pedestrian airbag device ML (MR) including the airbag 30 stored in a folded state in the vicinity of the rear end 8*a* of the hood panel 8 and inflated to cover the cowl 6 and the upper surface from the lower portion 4*a* side of the front windshield 4 to the front pillar 5L, which are regions near the hood panel 8, has been described as an example, but the mounting position of the pedestrian airbag device is not limited to the present embodiment. For example, the present invention may be applied to a pedestrian airbag device including an airbag configured to cover an upper surface side of a rear end side of a hood panel, an airbag configured to cover only a front surface side of a front pillar, or an airbag configured to cover an upper surface side of a front fender located on a side of the hood panel. Further, in the present embodiment, as the pedestrian airbag device, a configuration in which two airbags cover a region from the front surface (upper surface) side of the front pillar to the vicinity of the end edge on the rear end side of the hood panel (the vicinity of end edges of lower ends of a cowl and a front windshield) is exemplified, but the present invention is also applicable to a pedestrian airbag device of a type including one airbag having two pillar cover portions and a cowl cover portion disposed to connect these pillar cover portions. In the pedestrian airbag device of the present disclosure, since the airbag can receive the pedestrian at an appropriate internal pressure by appro-priately exhausting the inflation gas at the time of receiving the pedestrian while maintaining a high internal pressure at the time of completion of inflation, the present disclosure is particularly suitable for a pedestrian airbag device having a configuration in which two airbags having relatively small volumes are separately disposed.

The present invention is not limited to the above-de-scribed embodiments and modifications, and various modi-fications can be made without departing from the gist of the present invention. In addition, the present specification discloses not only the technical idea indicated by the citation relationship described in each claim at the time of filing, but also a technical idea obtained by appropriately combining the matters described in each claim.

What is claimed is:

1. A pedestrian protection airbag formed in a bag-shape, stored in a folded state in a case which has an opening and is disposed in a vicinity of a rear end of a vehicle hood panel, and protruding from the opening due to inflow of an inflation fluid to cover an upper surface of a front pillar, the pedes-trian protection airbag comprising:

an outer peripheral sewn portion in which a plurality of panels are sewn together in a state where an inflow port into which the inflation fluid is allowed to flow is formed, wherein the outer peripheral sewn portion has:

a general sewn portion; and a fragile sewn portion that is more easily broken than the general sewn portion, wherein the general sewn portion includes a first general sewn portion and a second general sewn portion in which stitches extend linearly, the first general sewn portion and the second general sewn portion being disposed separately from each other, wherein a vent hole portion is disposed between the first general sewn portion and the second general sewn portion, the vent hole portion allowing an inside of the pedestrian protection airbag and an outside of the pedestrian protection airbag to communicate with each other, wherein the fragile sewn portion is formed to close the vent hole portion, wherein the fragile sewn portion is formed to connect the first general sewn portion and the second general sewn portion in a non-linear manner, and wherein at least a part of a non-linearly connected portion of the fragile sewn portion is located further inside the pedestrian protection airbag than the vent hole portion which is disposed between the first general sewn por-tion and the second general sewn portion.

2. The pedestrian protection airbag according to claim 1, wherein the non-linearly connected portion of the fragile sewn portion includes a convex portion formed to protrude toward the inside of the pedestrian protection airbag.

3. The pedestrian protection airbag according to claim 2, wherein the convex portion has a corner portion bent in a middle of the convex portion.

4. A pedestrian airbag device comprising:

an airbag stored in a folded state in a storage portion which is disposed near a hood panel of a vehicle; and an inflator configured to supply inflation gas to the airbag, wherein the airbag is formed in a bag shape by joining outer peripheral edges of a vehicle body side panel disposed on a body side of the vehicle and a pedestrian side panel disposed on a pedestrian side when inflation is completed, the airbag includes:

a protection main body portion disposed to cover the hood panel or a region near the hood panel when the inflation is completed, and configured to receive a pedestrian; and a gas-exhaust portion opened when the pedestrian is received, and configured to exhaust inflation gas flowed into the protection main body portion, the gas-exhaust portion is formed to be continuous from the protection main body portion, is disposed to protrude outward from an outer peripheral edge joint portion that constitutes an outer peripheral edge of the protection main body portion when the inflation of the airbag is completed, and has a temporary joint portion configured to join the vehicle body side panel and the pedestrian side panel to close a terminal side in a region deviated outward from the outer peripheral edge joint portion, the temporary joint portion is configured to be released from a joining state between the vehicle body side panel and the pedestrian side panel when an internal pressure in the protection main body portion increases at a time of reception of the pedestrian, the temporary joint portion is configured by a sewn portion where the vehicle body side panel and the pedestrian side panel are sewn together using a sewing thread, the sewn portion has a starting point portion that is disposed at an intermediate portion to protrude toward a side of the protection main body portion, the starting point portion serves as a starting point of breakage when the internal pressure increases, and the intermediate portion is positioned at a region of an opening of the gas-exhaust portion.

5. The pedestrian airbag device according to claim 4, wherein the sewn portion has a wedge shape in which the intermediate portion protrudes inward toward the side of the protection main body portion.

* * * * *